United States Patent
Stenneth et al.

(10) Patent No.: US 11,713,979 B2
(45) Date of Patent: Aug. 1, 2023

(54) METHOD, APPARATUS, AND COMPUTER PROGRAM PRODUCT FOR GENERATING A TRANSITION VARIABILITY INDEX RELATED TO AUTONOMOUS DRIVING

(71) Applicant: HERE GLOBAL B.V., Eindhoven (NL)

(72) Inventors: Leon Stenneth, Chicago, IL (US); Jerome Beaurepaire, Berlin (DE); Jeremy Michael Young, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 250 days.

(21) Appl. No.: 17/122,497

(22) Filed: Dec. 15, 2020

(65) Prior Publication Data
US 2022/0063673 A1    Mar. 3, 2022

Related U.S. Application Data

(60) Provisional application No. 63/071,193, filed on Aug. 27, 2020.

(51) Int. Cl.
*G01C 21/00*    (2006.01)
*G05D 1/00*    (2006.01)
*G01C 21/36*    (2006.01)

(52) U.S. Cl.
CPC ....... *G01C 21/3841* (2020.08); *G05D 1/0088* (2013.01); *G01C 21/3667* (2013.01)

(58) Field of Classification Search
None
See application file for complete search history.

(56) References Cited

U.S. PATENT DOCUMENTS

| 8,762,048 B2 | 6/2014 | Kosseifi et al. |
| 9,365,213 B2 | 6/2016 | Stenneth et al. |

(Continued)

FOREIGN PATENT DOCUMENTS

| KR | 2020-0020324 A | 2/2020 |
| WO | WO 2013/087514 A1 | 6/2013 |

(Continued)

OTHER PUBLICATIONS

Dixit et al., "Autonomous Vehicles: Disengagements, Accidents and Reaction Times", PLoS One 11(12): 30168054., doi:10.1371/journal.pone.0168054 (Dec. 20, 2016).

(Continued)

*Primary Examiner* — Anne Marie Antonucci
*Assistant Examiner* — Amelia Vorce
(74) *Attorney, Agent, or Firm* — Alston & Bird LLP

(57) ABSTRACT

A method, apparatus and computer program product are provided for generating a transition variability index related to autonomous driving. In this regard, a first transition variability index is calculated. The first transition variability index is indicative of a first degree of variability in relation to transition of vehicles from respective autonomous levels while traveling proximate a first spatial reference point. Furthermore, a second transition variability index is generated. The second transition variability index is indicative of a second degree of variability in relation to transition of vehicles from respective autonomous levels while traveling along proximate a second spatial reference point. Updating of transition data associated with one of the first and second spatial reference points relative to another one of the first and second spatial reference points is then prioritized based on a comparison between the first transition variability index and the second transition variability index.

20 Claims, 7 Drawing Sheets

(56) References Cited

U.S. PATENT DOCUMENTS

| | | |
|---|---|---|
| 9,581,460 B1 | 2/2017 | McNew et al. |
| 9,587,952 B1 | 3/2017 | Slusar |
| 9,588,517 B2 | 3/2017 | Laur et al. |
| 9,688,288 B1 | 6/2017 | Lathrop et al. |
| 10,222,796 B2 | 3/2019 | Ichikawa et al. |
| 10,295,363 B1 | 5/2019 | Komardy et al. |
| 10,337,874 B2 | 7/2019 | Nagy et al. |
| 10,451,428 B2 | 10/2019 | Lathrop et al. |
| 10,503,168 B1 | 12/2019 | Komardy et al. |
| 10,543,841 B2 | 1/2020 | Karlsson et al. |
| 10,545,024 B1 | 1/2020 | Komardy et al. |
| 10,551,835 B2 | 2/2020 | Mason et al. |
| 10,595,175 B2 | 3/2020 | Ramalho de Oliveira |
| 2012/0165046 A1 | 6/2012 | Rhoads et al. |
| 2014/0309833 A1 | 10/2014 | Ferguson et al. |
| 2015/0253772 A1 | 9/2015 | Solyom et al. |
| 2016/0334797 A1 | 11/2016 | Ross et al. |
| 2017/0010613 A1 | 1/2017 | Fukumoto |
| 2017/0102700 A1 | 4/2017 | Kozak |
| 2017/0122749 A1 | 5/2017 | Urano et al. |
| 2017/0123419 A1 | 5/2017 | Levinson et al. |
| 2017/0160742 A1 | 6/2017 | Ross et al. |
| 2017/0212525 A1 | 7/2017 | Wang et al. |
| 2017/0227971 A1 | 8/2017 | Shimotani et al. |
| 2017/0248963 A1* | 8/2017 | Levinson ............ G06K 9/6288 |
| 2017/0301235 A1 | 10/2017 | Endo |
| 2017/0352125 A1 | 12/2017 | Dicker et al. |
| 2018/0107216 A1 | 4/2018 | Beaurepaire et al. |
| 2018/0266833 A1* | 9/2018 | Carlson ................ G01C 21/32 |
| 2018/0335776 A1 | 11/2018 | Theis et al. |
| 2018/0339712 A1 | 11/2018 | Kislovskiy et al. |
| 2018/0340790 A1* | 11/2018 | Kislovskiy ......... G01C 21/3484 |
| 2018/0362031 A1 | 12/2018 | Chang et al. |
| 2018/0376357 A1 | 12/2018 | Tavares Coutinho et al. |
| 2019/0041228 A1 | 2/2019 | Singhal |
| 2019/0049259 A1 | 2/2019 | Galan-Oliveras et al. |
| 2019/0049990 A1 | 2/2019 | Jafari Tafti et al. |
| 2019/0061782 A1 | 2/2019 | Cheaz et al. |
| 2019/0064803 A1 | 2/2019 | Frazzoli et al. |
| 2019/0096250 A1 | 3/2019 | Nix et al. |
| 2019/0110103 A1 | 4/2019 | el Kaliouby et al. |
| 2019/0120640 A1 | 4/2019 | Ho et al. |
| 2019/0135302 A1 | 5/2019 | Kishi et al. |
| 2019/0146508 A1 | 5/2019 | Dean et al. |
| 2019/0163176 A1 | 5/2019 | Wang et al. |
| 2019/0186936 A1 | 6/2019 | Ebner et al. |
| 2019/0202467 A1* | 7/2019 | Sun ....................... B60W 50/14 |
| 2019/0232955 A1 | 8/2019 | Grimm et al. |
| 2019/0232976 A1 | 8/2019 | Uetani et al. |
| 2019/0333120 A1 | 10/2019 | Ross et al. |
| 2020/0005206 A1 | 1/2020 | van Ryzin et al. |
| 2020/0010077 A1 | 1/2020 | Cormack et al. |
| 2020/0012873 A1 | 1/2020 | Kim |
| 2020/0039525 A1 | 2/2020 | Hu et al. |
| 2020/0056892 A1 | 2/2020 | Haque et al. |
| 2020/0057451 A1 | 2/2020 | Robert et al. |
| 2020/0079355 A1 | 3/2020 | Chen |
| 2020/0139979 A1 | 5/2020 | Kawanai et al. |
| 2020/0150652 A1* | 5/2020 | Urano ................. B60W 50/082 |
| 2020/0174470 A1 | 6/2020 | Park et al. |
| 2020/0233426 A1 | 7/2020 | Johnson et al. |
| 2020/0241526 A1* | 7/2020 | Kim ..................... G05D 1/0022 |
| 2020/0264605 A1 | 8/2020 | Chi-Johnston et al. |
| 2020/0264608 A1 | 8/2020 | Rosati et al. |
| 2020/0327812 A1 | 10/2020 | Ran et al. |
| 2020/0356100 A1 | 11/2020 | Nagarajan et al. |
| 2021/0034059 A1 | 2/2021 | Nagata et al. |
| 2021/0048815 A1* | 2/2021 | McErlean ............. B60W 50/14 |
| 2021/0063162 A1* | 3/2021 | Moskowitz ........... G01C 21/28 |
| 2021/0063178 A1* | 3/2021 | Modi .................... B60W 50/08 |
| 2021/0122398 A1 | 4/2021 | Kim |
| 2021/0163021 A1* | 6/2021 | Frazzoli ................. H04W 4/48 |
| 2021/0233284 A1* | 7/2021 | Sugio ..................... G06T 9/001 |
| 2021/0239476 A1 | 8/2021 | Duym et al. |
| 2021/0247199 A1 | 8/2021 | Johnson et al. |
| 2021/0341940 A1* | 11/2021 | Baik ................... G05D 1/0282 |
| 2022/0194433 A1 | 6/2022 | Nagata et al. |

FOREIGN PATENT DOCUMENTS

| | | |
|---|---|---|
| WO | WO 2013/165297 A1 | 11/2013 |
| WO | WO 2019/095013 A1 | 5/2019 |
| WO | WO 2019/118465 A2 | 6/2019 |
| WO | WO 2020/058431 A1 | 3/2020 |

OTHER PUBLICATIONS

Favaro et al., "Analysis of Disengagements in Semi-Autonomous Vehicles: Drivers Takeover Performance and Operational Implications", Mineta Transportation Institute, Project 1710 (Jun. 2019), 83 pages.

Favaro et al., "Autonomous Vehicle's Disengagements: Trends, Triggers, and Regulatory Limitations", Accident; Analysis and Prevention 110 (Nov. 1, 2017), pp. 136-148.

Gavanas, Nikolaos, "Autonomous Road Vehicles: Challenges for Urban Planning in European Cities", Urban Science (Jun. 3, 2019), 3, 61, 13 pages.

KPMG International Cooperative, "Assessing Countries' Preparedness for Autonomous Vehicles", KPMG 2019 Autonomous Vehicles Readiness Index (Mar. 2019), 56 pages.

Lv et al., "Analysis of Autopilot Disengagements Occurring During Autonomous Vehicle Testing", IEEE/CAA Journal of Automatica Sinica, vol. 5, No. 1 (Jan. 2018), pp. 58-68.

Extended European Search Report for European Application No. 21192183.8 dated Jan. 26, 2022, 11 pages.

Extended European Search Report for European Application No. 21192135.8 dated Feb. 3, 2022, 12 pages.

Non-Final Office Action for U.S. Appl. No. 17/122,452 dated May 18, 2022.

Non-Final Office Action for U.S. Appl. No. 17/122,465 dated Aug. 24, 2022.

Non-Final Office Action for U.S. Appl. No. 17/090,437 dated Jun. 3, 2022.

Non-Final Office Action for U.S. Appl. No. 17/090,561 dated Aug. 3, 2022.

Non-Final Office Action for U.S. Appl. No. 17/090,473 dated Apr. 7, 2022.

Final Office Action for U.S. Appl. No. 17/122,452 dated Oct. 6, 2022.

Final Office Action for U.S. Appl. No. 17/090,437 dated Oct. 17, 2022.

Non-Final Office Action for U.S. Appl. No. 17/090,525 dated Sep. 21, 2022.

Advisory Action for U.S. Appl. No. 17/122,452 dated Dec. 15, 2022.

Final Office Action for U.S. Appl. No. 17/090,473 dated Oct. 26, 2022.

Advisory Action for U.S. Appl. No. 17/090,437 dated Dec. 28, 2022.

Non-Final Office Action for U.S. Appl. No. 17/122,477 dated Jan. 17, 2023.

Final Office Action for U.S. Appl. No. 17/090,561 dated Jan. 12, 2023.

Non-Final Office Action for U.S. Appl. No. 17/122,452 dated Jan. 31, 2023.

Notice of Allowance for U.S. Appl. No. 17/090,473 dated Jan. 25, 2023.

Notice of Allowance for U.S. Appl. No. 17/122,465 dated Feb. 1, 2023.

Final Office Action for U.S. Appl. No. 17/090,525 dated Apr. 6, 2023.

Kamireddy, L., "Decision Making Protocol in Autonomous Vehicles for Optimal Routing and Safe Control", University of Colorado, Department of Electrical, Computer, and Energy Engineering, (2019), 62 pages.

(56) References Cited

OTHER PUBLICATIONS

Office Action for European Application No. 21192183.8 dated Apr. 5, 2023, 9 pages.

* cited by examiner

METHOD, APPARATUS, AND COMPUTER PROGRAM PRODUCT FOR GENERATING A TRANSITION VARIABILITY INDEX RELATED TO AUTONOMOUS DRIVING

CROSS-REFERENCE TO RELATED APPLICATIONS

This application claims the benefit of U.S. Provisional Patent Application No. 63/071,193, filed Aug. 27, 2020, the entire contents of which are incorporated herein by reference.

TECHNOLOGICAL FIELD

An example embodiment of the present disclosure generally relates to autonomous driving for vehicles and, more particularly, to a method, apparatus and computer program product for generating a transition variability index related to autonomous driving.

BACKGROUND

Vehicles are being built with more and more sensors to assist with autonomous driving and/or other vehicle technologies. Generally, sensors of a vehicle related to autonomous driving capture imagery data and/or radar data to assist with the autonomous driving. For instance, image sensors and Light Distancing and Ranging (LiDAR) sensors are popular sensor types for identifying objects along a road segment and establishing the safe path of traversal for a vehicle driving autonomously. Autonomous driving capabilities of vehicles are increasing toward full automation (e.g. Level 5 autonomy) with zero human interaction. However, there are numerous challenges related to autonomous driving capabilities of vehicles.

BRIEF SUMMARY

A method, apparatus and computer program product are provided in order to provide a transition variability index for spatial reference points associated with road segments. The method, apparatus and computer program product of an example embodiment are configured to employ degrees of variability in relation to transition of vehicles from respective autonomous levels to determine a transition variability index for spatial reference points associated with road segments. As such, precision and/or confidence of autonomous driving capabilities for a vehicle can be improved. Furthermore, improved navigation of a vehicle, improved route guidance for a vehicle, improved semi-autonomous vehicle control, and/or improved fully autonomous vehicle control can be provided.

In an example embodiment, a computer-implemented method is provided for generating a transition variability index related to autonomous driving. The computer-implemented method includes calculating a first transition variability index indicative of a first degree of variability in relation to transition of vehicles from respective autonomous levels while traveling proximate a first spatial reference point during different intervals of time. The computer-implemented method also includes calculating a second transition variability index indicative of a second degree of variability in relation to transition of vehicles from respective autonomous levels while traveling along proximate a second spatial reference point during the different intervals of time. Furthermore, the computer-implemented method includes prioritizing updating of transition data associated with one of the first and second spatial reference points relative to another one of the first and second spatial reference points based on a comparison between the first transition variability index for the first spatial reference point and the second transition variability index for the second spatial reference point. The computer-implemented method also includes encoding the transition data that has been updated for the one of the first and second spatial reference points in a database to facilitate autonomous driving proximate the one of the first and second spatial reference points.

In an example embodiment, the prioritizing updating of the transition data includes updating the transition data for the first spatial reference point prior to the transition data for the second spatial reference point in response to a determination that the first transition variability index for the first spatial reference point is indicative of greater variability than the second transition variability index for the second spatial reference point.

In another example embodiment, the calculating the first transition variability index includes calculating a transition variability index that is indicative of a transition from a particular autonomous level due to a decrease in a strength of a communication signal associated with a vehicle while traveling proximate the first spatial reference point. In yet another example embodiment, the calculating the first transition variability index includes calculating a transition variability index that is indicative of a transition from a particular autonomous level due to satisfaction of a particular road condition while traveling proximate the first spatial reference point. In yet another example embodiment, the calculating the first transition variability index includes calculating a transition variability index for a vehicle that is disengaged from a particular autonomous level due to the first spatial reference point satisfying a particular traffic condition while traveling along the first spatial reference point. In yet another example embodiment, the calculating the first transition variability index includes calculating a transition variability index for a first vehicle that is disengaged from a particular autonomous level due to the first spatial reference point satisfying a pedestrian traffic condition while traveling along the first spatial reference point.

In another example embodiment, the computer-implemented method also includes facilitating routing of a vehicle associated with the first spatial reference point based on the transition data. In yet another example embodiment, the computer-implemented method also includes causing rendering of data via a map display based on the transition data.

In another example embodiment, an apparatus is configured to generate a transition variability index related to autonomous driving. The apparatus includes processing circuitry and at least one memory including computer program code instructions that are configured to, when executed by the processing circuitry, cause the apparatus to calculate a first transition variability index indicative of a first degree of variability in relation to transition of vehicles from respective autonomous levels while traveling proximate a first spatial reference point during different intervals of time. The computer program code instructions are also configured to, when executed by the processing circuitry, cause the apparatus to calculate a second transition variability index indicative of a second degree of variability in relation to transition of vehicles from respective autonomous levels while traveling along proximate a second spatial reference point during the different intervals of time. The computer program code instructions are also configured to, when executed by the processing circuitry, cause the apparatus to prioritize updating of transition data associated with one of the first and second spatial reference points relative to another one of the first and second spatial reference points based on a comparison between the first transition variability index for the first spatial reference point and the second transition variability index for the second spatial reference point. The computer program code instructions are also configured to, when executed by the processing circuitry, cause the apparatus to encode the transition data that has been updated for the one of the first and second spatial reference points in a database to facilitate autonomous driving proximate the one of the first and second spatial reference points.

In another example embodiment, a computer program product is provided to generate a transition variability index related to autonomous driving. The computer program product includes at least one non-transitory computer readable storage medium having computer-executable program code instructions stored therein with the computer-executable program code instructions including program code instructions configured, upon execution, to calculate a first transition variability index indicative of a first degree of variability in relation to transition of vehicles from respective autonomous levels while traveling proximate a first spatial reference point during different intervals of time. The computer-executable program code instructions are also configured to calculate a second transition variability index indicative of a second degree of variability in relation to transition of vehicles from respective autonomous levels while traveling along proximate a second spatial reference point during the different intervals of time. Furthermore, the computer-executable program code instructions are configured to prioritize updating of transition data associated with one of the first and second spatial reference points relative to another one of the first and second spatial reference points based on a comparison between the first transition variability index for the first spatial reference point and the second transition variability index for the second spatial reference point. The computer-executable program code instructions are also configured to encode the transition data that has been updated for the one of the first and second spatial reference points in a database to facilitate autonomous driving proximate the one of the first and second spatial reference points.

In another example embodiment, an apparatus is provided that includes means for generating a transition variability index related to autonomous driving. The apparatus of this example embodiment also includes means for calculating a first transition variability index indicative of a first degree of variability in relation to transition of vehicles from respective autonomous levels while traveling proximate a first spatial reference point during different intervals of time. The apparatus of this example embodiment also includes means for calculating a second transition variability index indicative of a second degree of variability in relation to transition of vehicles from respective autonomous levels while traveling along proximate a second spatial reference point during the different intervals of time. The apparatus of this example embodiment also includes means for prioritizing updating of transition data associated with one of the first and second spatial reference points relative to another one of the first and second spatial reference points based on a comparison between the first transition variability index for the first spatial reference point and the second transition variability index for the second spatial reference point. The apparatus of this example embodiment also includes means for encoding the transition data that has been updated for the one of the first and second spatial reference points in a database to facilitate autonomous driving proximate the one of the first and second spatial reference points.

In another example embodiment, an apparatus is configured to generate a transition variability index related to autonomous driving. The apparatus includes processing circuitry and at least one memory including computer program code instructions that are configured to, when executed by the processing circuitry, cause the apparatus to calculate a transition variability index that comprises first variability data associated with a first degree of variability in relation to transition of vehicles from respective autonomous levels while traveling proximate a first spatial reference point during different intervals of time, and second variability data associated with a second degree of variability in relation to transition of vehicles from respective autonomous levels while traveling along proximate a second spatial reference point during the different intervals of time. The computer program code instructions are also configured to, when executed by the processing circuitry, cause the apparatus to prioritize updating of transition data associated with one of the first and second spatial reference points relative to another one of the first and second spatial reference points based on a comparison between the first variability data for the first spatial reference point and the second variability data for the second spatial reference point. The computer program code instructions are also configured to, when executed by the processing circuitry, cause the apparatus to encode the transition data that has been updated for the one of the first and second spatial reference points in a database to facilitate autonomous driving proximate the one of the first and second spatial reference points.

The computer program code instructions are further configured to, when executed by the processing circuitry, cause the apparatus of an example embodiment to update the transition data for the first spatial reference point prior to the transition data for the second spatial reference point in response to a determination that the first variability data for the first spatial reference point is indicative of greater variability than the second variability data for the second spatial reference point.

The computer program code instructions are further configured to, when executed by the processing circuitry, cause the apparatus of an example embodiment to calculate a transition variability index that is indicative of transition from a particular autonomous level due to a decrease in a strength of a communication signal associated with a vehicle while traveling proximate the first spatial reference point. The computer program code instructions are further configured to, when executed by the processing circuitry, cause the apparatus of an example embodiment to calculate a transition variability index that is indicative of transition from a particular autonomous level due to satisfaction of a particular road condition while traveling proximate the first spatial reference point. The computer program code instructions are further configured to, when executed by the processing circuitry, cause the apparatus of an example embodiment to calculate a transition variability index for a vehicle that is disengaged from a particular autonomous level due to the first spatial reference point satisfying a particular traffic condition while traveling along the first spatial reference point. The computer program code instructions are further configured to, when executed by the processing circuitry, cause the apparatus of an example embodiment to calculate a transition variability index for a first vehicle that is disengaged from a particular autonomous level due to the first spatial reference point satisfying a pedestrian traffic condition while traveling along the first spatial reference point.

The computer program code instructions are further configured to, when executed by the processing circuitry, cause the apparatus of an example embodiment to facilitate routing of a vehicle associated with the first spatial reference point based on the transition data. The computer program code instructions are further configured to, when executed by the processing circuitry, cause the apparatus of an example embodiment to cause rendering of data via a map display based on the transition data.

In an example embodiment, a computer-implemented method is provided for generating a transition variability index related to autonomous driving. The computer-implemented method includes calculating a transition variability index that comprises first variability data associated with a first degree of variability in relation to transition of vehicles from respective autonomous levels while traveling proximate a first spatial reference point during different intervals of time, and second variability data associated with a second degree of variability in relation to transition of vehicles from respective autonomous levels while traveling along proximate a second spatial reference point during the different intervals of time. The computer-implemented method also includes prioritizing updating of transition data associated with one of the first and second spatial reference points relative to another one of the first and second spatial reference points based on a comparison between the first variability data for the first spatial reference point and the second variability data for the second spatial reference point. Furthermore, the computer-implemented method includes encoding the transition data that has been updated for the one of the first and second spatial reference points in a database to facilitate autonomous driving proximate the one of the first and second spatial reference points.

In another example embodiment, a computer program product is provided to generate a transition variability index related to autonomous driving. The computer program product includes at least one non-transitory computer readable storage medium having computer-executable program code instructions stored therein with the computer-executable program code instructions including program code instructions configured, upon execution, to calculate a transition variability index that comprises first variability data associated with a first degree of variability in relation to transition of vehicles from respective autonomous levels while traveling proximate a first spatial reference point during different intervals of time, and second variability data associated with a second degree of variability in relation to transition of vehicles from respective autonomous levels while traveling along proximate a second spatial reference point during the different intervals of time. The computer-executable program code instructions are also configured to prioritize updating of transition data associated with one of the first and second spatial reference points relative to another one of the first and second spatial reference points based on a comparison between the first variability data for the first spatial reference point and the second variability data for the second spatial reference point. Furthermore, the computer-executable program code instructions are configured to encode the transition data that has been updated for the one of the first and second spatial reference points in a database to facilitate autonomous driving proximate the one of the first and second spatial reference points.

In another example embodiment, an apparatus is provided that includes means for generating a transition variability index related to autonomous driving. The apparatus of this example embodiment also includes means for calculating a transition variability index that comprises first variability data associated with a first degree of variability in relation to transition of vehicles from respective autonomous levels while traveling proximate a first spatial reference point during different intervals of time, and second variability data associated with a second degree of variability in relation to transition of vehicles from respective autonomous levels while traveling along proximate a second spatial reference point during the different intervals of time. The apparatus of this example embodiment also includes means for prioritizing updating of transition data associated with one of the first and second spatial reference points relative to another one of the first and second spatial reference points based on a comparison between the first variability data for the first spatial reference point and the second variability data for the second spatial reference point. The apparatus of this example embodiment also includes means for encoding the transition data that has been updated for the one of the first and second spatial reference points in a database to facilitate autonomous driving proximate the one of the first and second spatial reference points.

In another example embodiment, a computer program product is provided to generate a transition variability index related to autonomous driving. The computer program product includes at least one non-transitory computer readable storage medium having computer-executable program code instructions stored therein with the computer-executable program code instructions including program code instructions configured, upon execution, to calculate a first transition variability index indicative of a first degree of variability in relation to transition of vehicles from respective autonomous levels while traveling proximate a first spatial reference point during different intervals of time. The computer-executable program code instructions are also configured to calculate a second transition variability index indicative of a second degree of variability in relation to transition of vehicles from respective autonomous levels while traveling along proximate a second spatial reference point during the different intervals of time. Furthermore, the computer-executable program code instructions are configured to facilitate navigation of a vehicle proximate one of the first and second spatial reference points based on a comparison between the first transition variability index for the first spatial reference point and the second transition variability index for the second spatial reference point.

In another example embodiment, the computer-executable program code instructions are also configured to facilitate autonomous driving of the vehicle proximate the one of the first and second spatial reference points based on the comparison between the first transition variability index for the first spatial reference point and the second transition variability index for the second spatial reference point. In another example embodiment, the computer-executable program code instructions are also configured to facilitate routing of the vehicle proximate the one of the first and second spatial reference points based on the comparison between the first transition variability index for the first spatial reference point and the second transition variability index for the second spatial reference point. In another example embodiment, the computer-executable program code instructions are also configured to cause rendering of data via a map display of the vehicle based on the comparison between the first transition variability index for the first spatial reference point and the second transition variability index for the second spatial reference point.

In an example embodiment, a computer-implemented method is provided for generating a transition variability index related to autonomous driving. The computer-implemented method includes calculating a first transition variability index indicative of a first degree of variability in relation to transition of vehicles from respective autonomous levels while traveling proximate a first spatial reference point during different intervals of time. The computer-implemented method also includes calculating a second transition variability index indicative of a second degree of variability in relation to transition of vehicles from respective autonomous levels while traveling along proximate a second spatial reference point during the different intervals of time. Furthermore, the computer-implemented method includes facilitating navigation of a vehicle proximate one of the first and second spatial reference points based on a comparison between the first transition variability index for the first spatial reference point and the second transition variability index for the second spatial reference point.

In another example embodiment, an apparatus is configured to generate a transition variability index related to autonomous driving. The apparatus includes processing circuitry and at least one memory including computer program code instructions that are configured to, when executed by the processing circuitry, cause the apparatus to calculate a first transition variability index indicative of a first degree of variability in relation to transition of vehicles from respective autonomous levels while traveling proximate a first spatial reference point during different intervals of time. The computer program code instructions are also configured to, when executed by the processing circuitry, cause the apparatus to calculate a second transition variability index indicative of a second degree of variability in relation to transition of vehicles from respective autonomous levels while traveling along proximate a second spatial reference point during the different intervals of time. The computer program code instructions are also configured to, when executed by the processing circuitry, cause the apparatus to facilitate navigation of a vehicle proximate one of the first and second spatial reference points based on a comparison between the first transition variability index for the first spatial reference point and the second transition variability index for the second spatial reference point.

In another example embodiment, an apparatus is provided that includes means for generating a transition variability index related to autonomous driving. The apparatus of this example embodiment also includes means for calculating a first transition variability index indicative of a first degree of variability in relation to transition of vehicles from respective autonomous levels while traveling proximate a first spatial reference point during different intervals of time. The apparatus of this example embodiment also includes means for calculating a second transition variability index indicative of a second degree of variability in relation to transition of vehicles from respective autonomous levels while traveling along proximate a second spatial reference point during the different intervals of time. The apparatus of this example embodiment also includes means for facilitating navigation of a vehicle proximate one of the first and second spatial reference points based on a comparison between the first transition variability index for the first spatial reference point and the second transition variability index for the second spatial reference point.

BRIEF DESCRIPTION OF THE DRAWINGS

Figure 1:
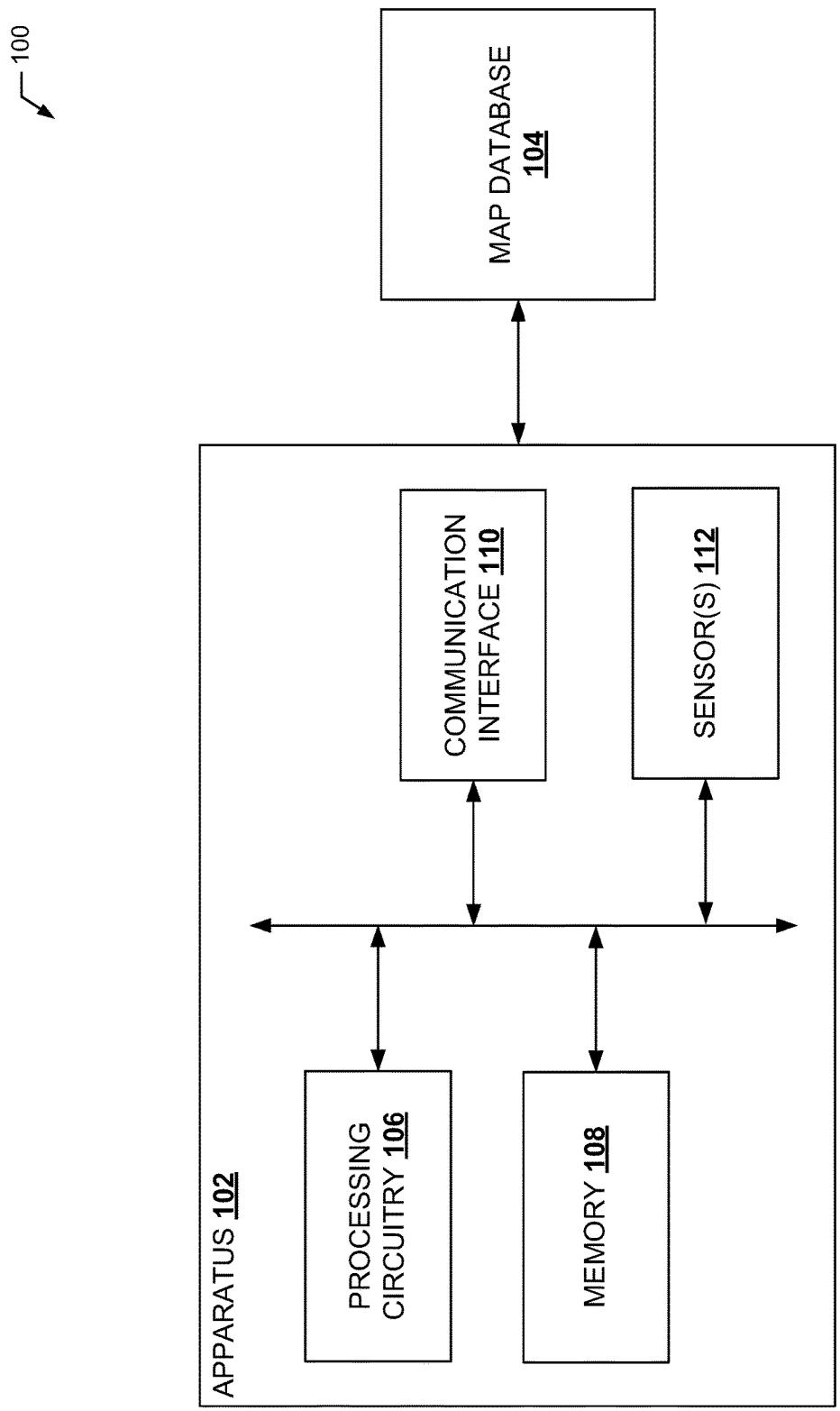
Figure 2:
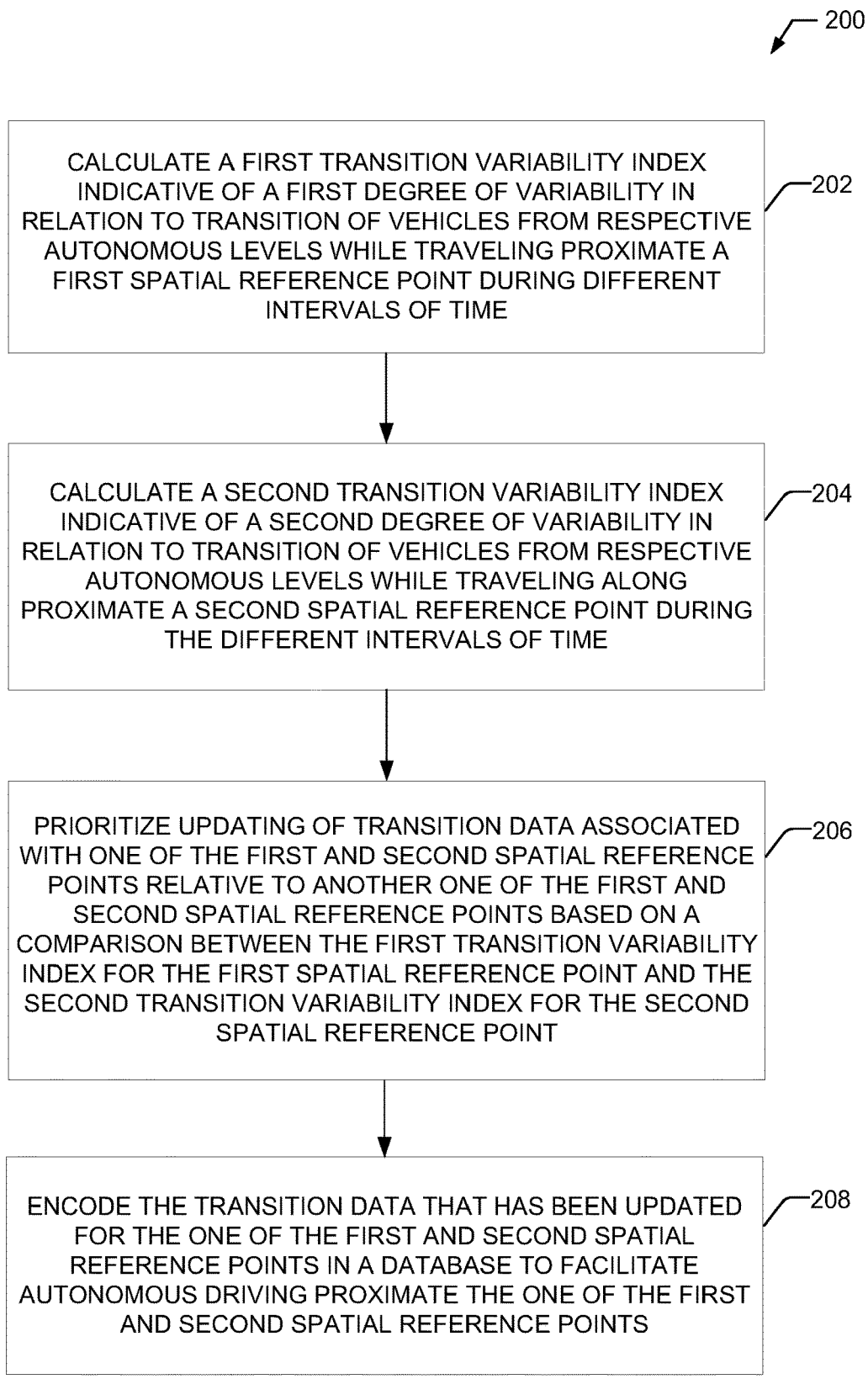
Figure 3:
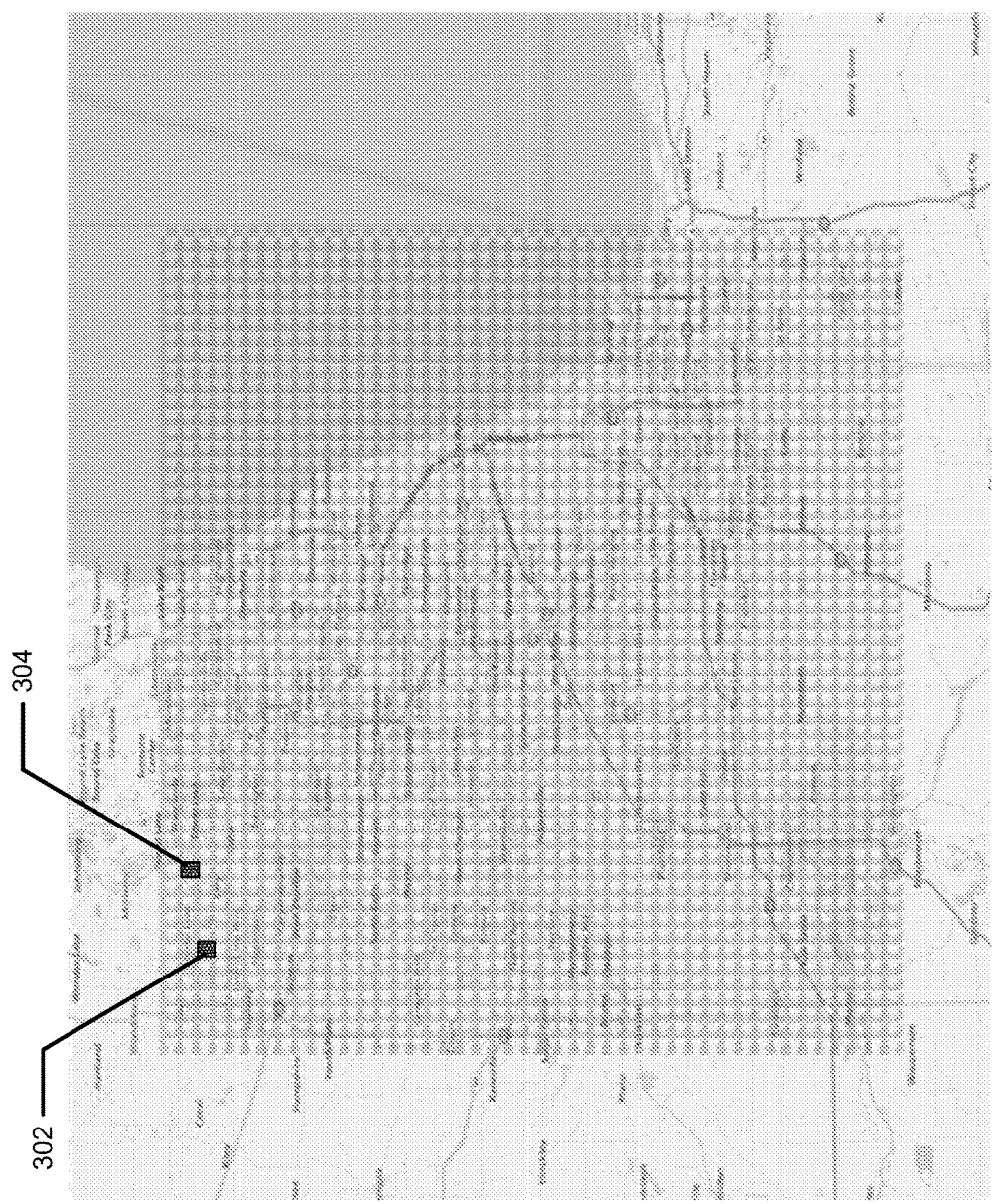
Figure 4:
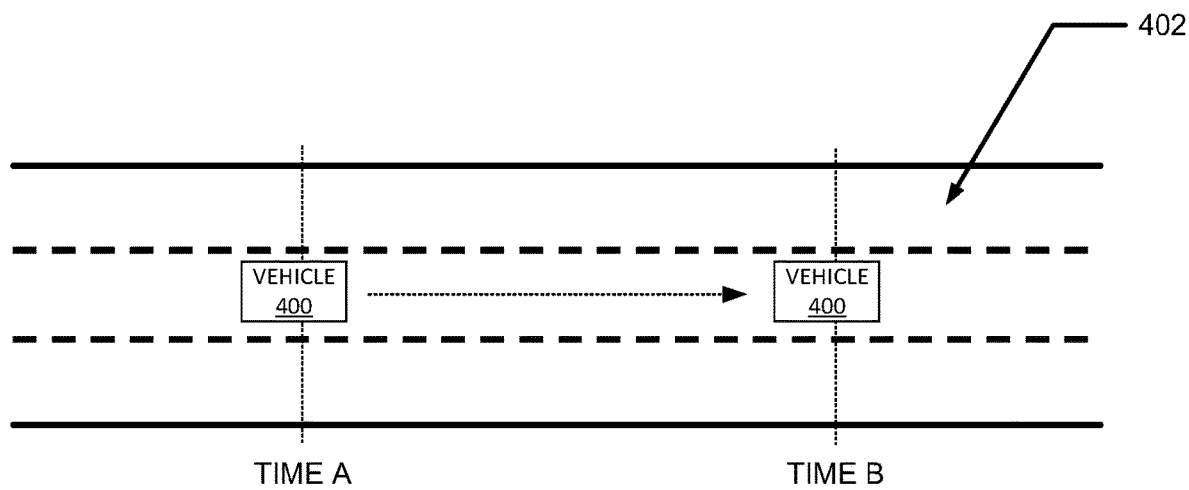
Figure 5:
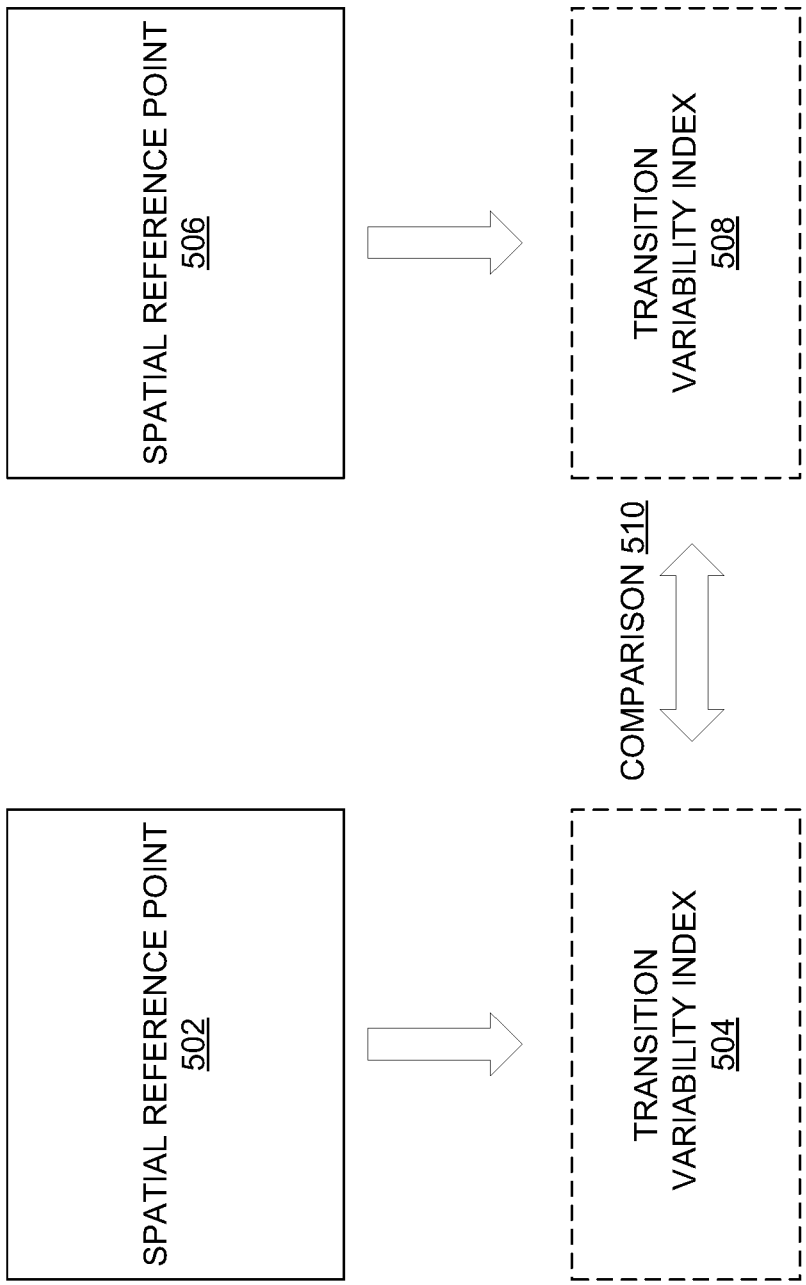
Figure 6:
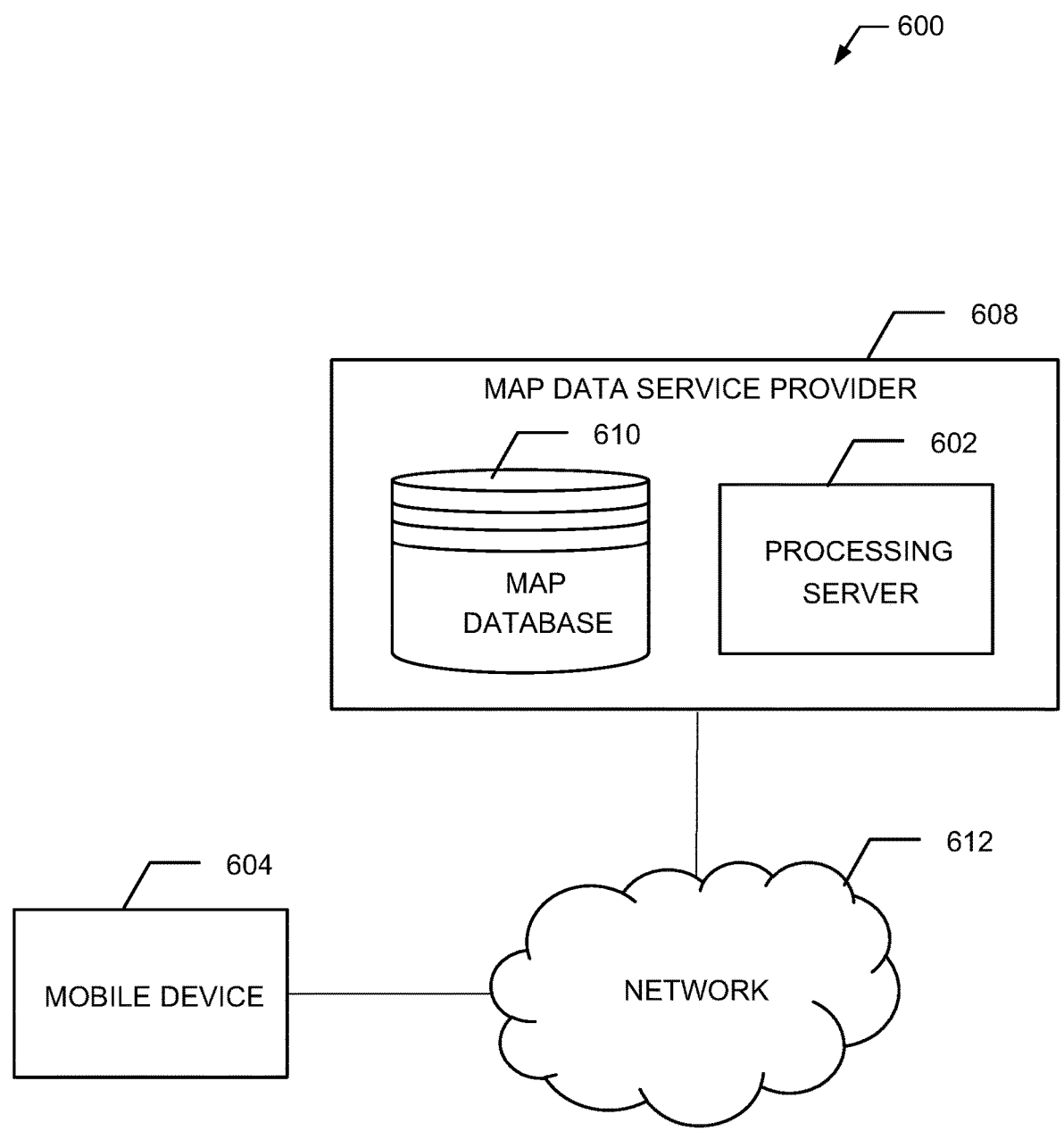
Figure 7:
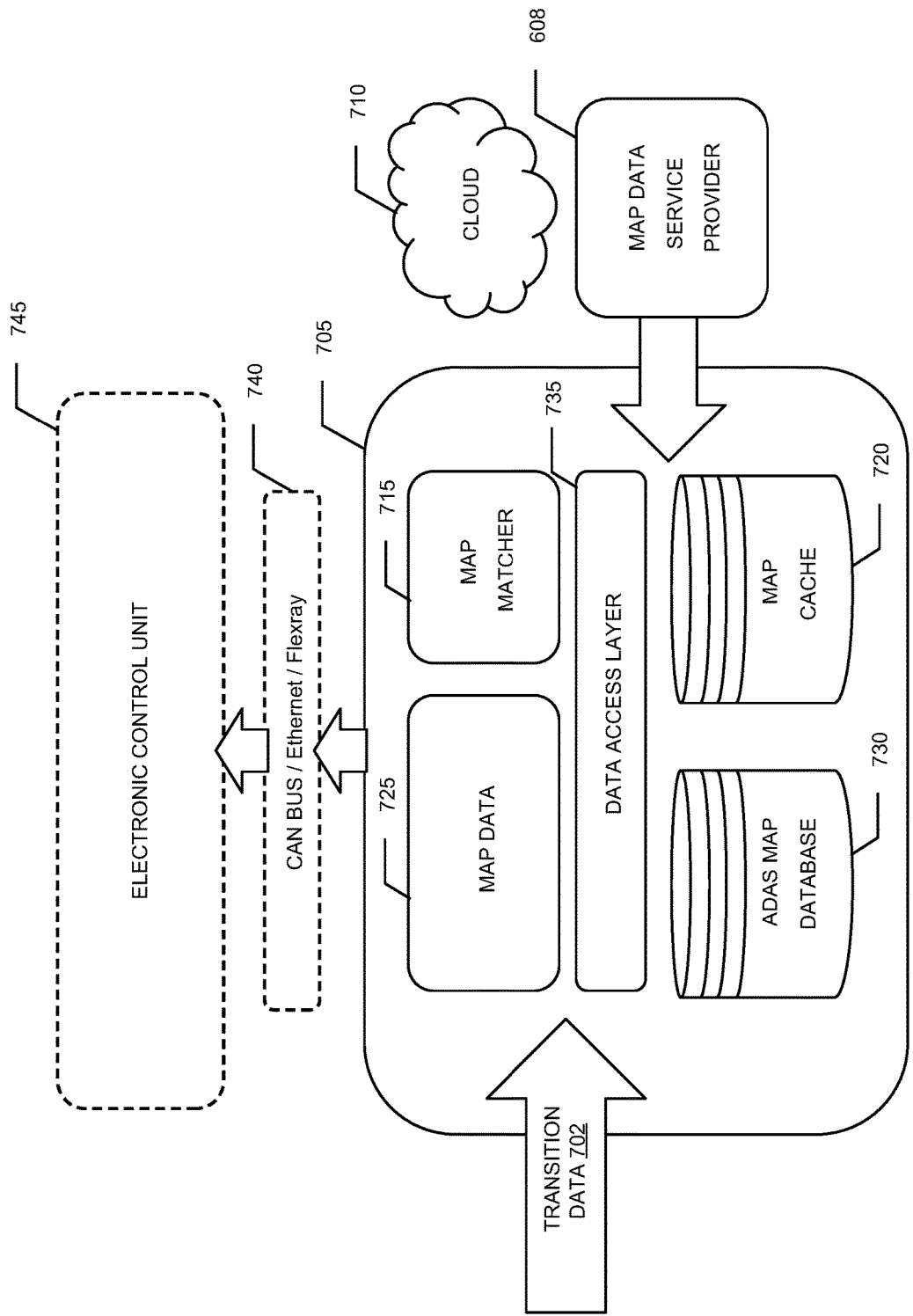

Having thus described certain embodiments of the disclosure in general terms, reference will now be made to the accompanying drawings, which are not necessarily drawn to scale, and wherein:

FIG. 1 is a block diagram of a system including an apparatus for providing a transition variability index related to autonomous driving in accordance with one or more example embodiments of the present disclosure;

FIG. 2 is a flowchart illustrating operations performed, such as by the apparatus of FIG. 1, in order to provide for generating a transition variability index related to autonomous driving in accordance with one or more example embodiments of the present disclosure;

FIG. 3 illustrates a map divided into autonomous transition regions in accordance with one or more example embodiments of the present disclosure;

FIG. 4 illustrates a vehicle with respect to a road segment in accordance with one or more example embodiments of the present disclosure;

FIG. 5 illustrates a comparison of transition variability indexes associated with spatial reference points in accordance with one or more example embodiments of the present disclosure;

FIG. 6 is a block diagram of a system for using transition data to facilitate generation of map data in accordance with one or more example embodiments of the present disclosure; and FIG. 7 is an example embodiment of an architecture specifically configured for implementing embodiments described herein.

DETAILED DESCRIPTION

Some embodiments of the present disclosure will now be described more fully hereinafter with reference to the accompanying drawings, in which some, but not all, embodiments of the disclosure are shown. Indeed, various embodiments of the disclosure can be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms can be used interchangeably to refer to data capable of being transmitted, received and/or stored in accordance with embodiments of the present disclosure. Thus, use of any such terms should not be taken to limit the spirit and scope of embodiments of the present disclosure.

A vehicle can become disengaged from an autonomous driving level due to, for example, environmental conditions, vehicle capabilities, sensor failures, software versions for components of a vehicle, hardware versions for components of a vehicle, sensor configurations for a vehicle, etc. To address these and/or other issues, a method, apparatus and computer program product are provided in accordance with an example embodiment in order to provide a transition variability index related to autonomous driving. In an embodiment, data can be collected from vehicles (e.g., autonomous driving vehicles) to facilitate mapping areas (e.g., road segments) along with a calculated likelihood that a level of autonomous driving will be possible or not for the areas. Accordingly, with this information, prediction as to whether a vehicle can successfully drive autonomously can be improved. Furthermore, in certain embodiments, navigation guidance for a vehicle can be re-routed to a route associated with an improved likelihood of driving autonomously. According to one or more embodiments, it can be determined when a level of autonomous driving mode for a vehicle is changed. In response to the change in the level of autonomous driving mode, data associated with the vehicle can collected. The collected data can include, for example, a vehicle make for the vehicle, a vehicle model for the vehicle, a previous autonomous level for the vehicle, a current autonomous level for the vehicle, a location of the vehicle during the change in the level of autonomous driving mode, a decision time of the vehicle associated with a decision to initiate the change in the level of autonomous driving mode, an execution time of the vehicle associated with execution of the change in the level of autonomous driving mode, version information for autonomous driving software and/or hardware employed by the vehicle, a reason for the change in the level of autonomous driving mode for the vehicle, and/or other information associated with the vehicle. In certain embodiments, data associated with multiple vehicles in an area can be collected via crowdsourcing to provide improved autonomous driving predictions for the area.

According to one or more embodiments, the data associated with the vehicles can be uploaded to a mapping server. Furthermore, the data from the vehicles can be aggregated into information to facilitate mapping and/or generating patterns for changes in autonomous driving modes for vehicles. In certain embodiments, an autonomous driving mode value can be mapped onto a road network and/or a road lane network. For example, in certain embodiments, an autonomous driving mode value can correspond to a number between 0-1 that corresponds to a percentage change of likelihood to demonstrate a particular autonomous level prediction. In certain embodiments, an autonomous driving mode value can be mapped by level of defined autonomy such as, for example, Level 0 that corresponds to no automation, Level 1 that corresponds to driver assistance, Level 2 that corresponds to partial automation, Level 3 that corresponds to conditional automation, Level 4 that corresponds to high automation, Level 5 that corresponds to full automation, and/or another sub-level associated with a degree of autonomous driving. In certain embodiments, different map layers can correspond to different levels of autonomous driving. Additionally, in certain embodiments, a map layer can be generated based on vehicle data such as, for example, a particular make/model of a vehicle, particular autonomous driving capabilities for a vehicle, other vehicle data, etc.

According to one or more embodiments, a transition variability index for a spatial reference point associated with a road segment can be determined. In one or more embodiments, the transition variability index can provide an indication how volatile an autonomous level transition reason is for a given spatial reference point associated with a road segment. The autonomous level transition reason can be a reason for a vehicle to transition to a different level of defined autonomy. In an embodiment, the autonomous level transition reason can be a reason that a vehicle disengages from a particular level of defined autonomy. In another embodiment, the autonomous level transition reason can be a reason that a vehicle engages into a particular level of defined autonomy. The autonomous level transition reason can include, for example, a decrease in communication signal strength for a vehicle (e.g. loss of a 5G signal employed by a vehicle), a road condition (e.g., road construction, high pedestrian traffic, etc.) being present at a particular spatial reference point associated with a road segment, a particular environmental condition (e.g., a particular weather condition, etc.) present at a particular spatial reference point associated with a road segment, another type of reason, etc.

In one or more embodiments, historical data for autonomous level transition scores can be gathered and/or sorted for each spatial reference point. In an embodiment, historical data for autonomous level transition scores can be sorted based on time data (e.g., time of capture of autonomous level data for vehicles). In another embodiment, historical data for autonomous level transition scores can be filtered. For example, in one or more embodiments, autonomous level transition values outside a predefined range (e.g., outside a range from 0 to 1) can be suppressed. Furthermore, according to various embodiments, an average of differences across different time epochs can be employed as a measure of variability for a transition variability index. In one or more embodiments, transition variability indexes for spatial reference points associated with road segments can be employed to determine which set of spatial reference points to give priority for updating with new autonomous level transition information. For example, in one or more embodiments, transition variability indexes for spatial reference points associated with road segments can be employed to determine whether to update autonomous level transition information for a given spatial reference point or a different spatial reference point first.

Accordingly, transition variability indexes for spatial reference points associated with road segments can be employed to provide improved autonomous driving and/or vehicle localization for a vehicle. Moreover, transition variability indexes for spatial reference points associated with road segments can provide additional dimensionality and/or advantages for one or more sensors of a vehicle. Transition variability indexes for spatial reference points associated with road segments can also provide a low cost and/or efficient solution for improved autonomous driving and/or vehicle localization for a vehicle. Computational resources for improved autonomous driving and/or vehicle localization can also be conserved. Transition variability indexes for spatial reference points associated with road segments can also provide a cost effective and/or efficient solution for improved autonomous driving and/or vehicle localization. Computational resources for improved autonomous driving and/or vehicle localization utilizing an automated driving capability map index for vehicles can also be relatively limited in order to allow the computational resources to be utilized for other purposes. Transition variability indexes for spatial reference points associated with road segments may additionally facilitate improved navigation of a vehicle, improved route guidance for a vehicle, improved semi-autonomous vehicle control, and/or improved fully autonomous vehicle control.

With reference to FIG. 1, a system 100 configured to provide a transition variability index related to autonomous driving is depicted, in accordance with one or more embodiments of the present disclosure. In the illustrated embodiment, the system 100 includes an apparatus 102 and a map database 104. As described further below, the apparatus 102 is configured in accordance with an example embodiment of the present disclosure to assist navigation of a vehicle and/or to autonomous driving for a vehicle. The apparatus 102 can be embodied by any of a wide variety of computing devices including, for example, a computer system of a vehicle, a vehicle system of a vehicle, a navigation system of a vehicle, a control system of a vehicle, an electronic control unit of a vehicle, an autonomous vehicle control system (e.g., an autonomous-driving control system) of a vehicle, a mapping system of a vehicle, an Advanced Driver Assistance System module (ADAS of a vehicle), or any other type of computing device carried by or remote from the vehicle including, for example, a server or a distributed network of computing devices.

In an example embodiment where some level of vehicle autonomy is involved, the apparatus 102 can be embodied or partially embodied by a computing device of a vehicle that supports safety-critical systems such as the powertrain (engine, transmission, electric drive motors, etc.), steering (e.g., steering assist or steer-by-wire), and/or braking (e.g., brake assist or brake-by-wire). However, as certain embodiments described herein may optionally be used for map generation, map updating, and map accuracy confirmation, other embodiments of the apparatus may be embodied or partially embodied as a mobile terminal, such as a personal digital assistant (PDA), mobile telephone, smart phone, personal navigation device, smart watch, tablet computer, camera or any combination of the aforementioned and other types of voice and text communications systems. Regardless of the type of computing device that embodies the apparatus 102, the apparatus 102 of an example embodiment includes, is associated with or otherwise is in communication with processing circuitry 106, memory 108 and optionally a communication interface 110.

In some embodiments, the processing circuitry 106 (and/or co-processors or any other processors assisting or otherwise associated with the processing circuitry 106) can be in communication with the memory 108 via a bus for passing information among components of the apparatus 102. The memory 108 can be non-transitory and can include, for example, one or more volatile and/or non-volatile memories. In other words, for example, the memory 108 may be an electronic storage device (for example, a computer readable storage medium) comprising gates configured to store data (for example, bits) that can be retrievable by a machine (for example, a computing device like the processing circuitry 106). The memory 108 can be configured to store information, data, content, applications, instructions, or the like for enabling the apparatus 100 to carry out various functions in accordance with an example embodiment of the present disclosure. For example, the memory 108 can be configured to buffer input data for processing by the processing circuitry 106. Additionally or alternatively, the memory 108 can be configured to store instructions for execution by the processing circuitry 106.

The processing circuitry 106 can be embodied in a number of different ways. For example, the processing circuitry 106 may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry 106 can include one or more processing cores configured to perform independently. A multi-core processor can enable multiprocessing within a single physical package. Additionally or alternatively, the processing circuitry 106 can include one or more processors configured in tandem via the bus to enable independent execution of instructions, pipelining and/or multithreading.

In an example embodiment, the processing circuitry 106 can be configured to execute instructions stored in the memory 108 or otherwise accessible to the processing circuitry 106. Alternatively or additionally, the processing circuitry 106 can be configured to execute hard coded functionality. As such, whether configured by hardware or software methods, or by a combination thereof, the processing circuitry 106 can represent an entity (for example, physically embodied in circuitry) capable of performing operations according to an embodiment of the present disclosure while configured accordingly. Thus, for example, when the processing circuitry 106 is embodied as an ASIC, FPGA or the like, the processing circuitry 106 can be specifically configured hardware for conducting the operations described herein. Alternatively, as another example, when the processing circuitry 106 is embodied as an executor of software instructions, the instructions can specifically configure the processing circuitry 106 to perform the algorithms and/or operations described herein when the instructions are executed. However, in some cases, the processing circuitry 106 can be a processor of a specific device (for example, a computing device) configured to employ an embodiment of the present disclosure by further configuration of the processor by instructions for performing the algorithms and/or operations described herein. The processing circuitry 106 can include, among other things, a clock, an arithmetic logic unit (ALU) and/or one or more logic gates configured to support operation of the processing circuitry 106.

The apparatus 102 of an example embodiment can also optionally include the communication interface 110 that can be any means such as a device or circuitry embodied in either hardware or a combination of hardware and software that is configured to receive and/or transmit data from/to other electronic devices in communication with the apparatus 102, such as the map database 104 that stores data (e.g., map data, autonomous level data, variability data, transition variability index data, location data, geo-referenced locations, time data, timestamp data, temporal data, vehicle data, vehicle version data, software version data, hardware version data, vehicle speed data, distance data, vehicle context data, statistical data, etc.) generated and/or employed by the processing circuitry 106. Additionally or alternatively, the communication interface 110 can be configured to communicate in accordance with various wireless protocols including Global System for Mobile Communications (GSM), such as but not limited to Long Term Evolution (LTE). In this regard, the communication interface 110 can include, for example, an antenna (or multiple antennas) and supporting hardware and/or software for enabling communications with a wireless communication network. In this regard, the communication interface 110 can include, for example, an antenna (or multiple antennas) and supporting hardware and/or software for enabling communications with a wireless communication network. Additionally or alternatively, the communication interface 110 can include the circuitry for interacting with the antenna(s) to cause transmission of signals via the antenna(s) or to handle receipt of signals received via the antenna(s). In some environments, the communication interface 110 can alternatively or also support wired communication and/or may alternatively support vehicle to vehicle or vehicle to infrastructure wireless links.

In certain embodiments, the apparatus 102 can be equipped or associated with one or more sensors 112, such as one or more GPS sensors, one or more accelerometer sensors, one or more LiDAR sensors, one or more radar sensors, one or more gyroscope sensors, one or more ultrasonic sensors, one or more infrared sensors and/or one or more other sensors. Any of the one or more sensors 112 may be used to sense information regarding movement, positioning, and/or orientation of the apparatus 102 for use in navigation assistance and/or autonomous vehicle control, as described herein according to example embodiments.

FIG. 2 illustrates a flowchart depicting a method 200 according to an example embodiment of the present disclosure. It will be understood that each block of the flowchart and combination of blocks in the flowchart can be implemented by various means, such as hardware, firmware, processor, circuitry, and/or other communication devices associated with execution of software including one or more computer program instructions. For example, one or more of the procedures described above can be embodied by computer program instructions. In this regard, the computer program instructions which embody the procedures described above can be stored, for example, by the memory 108 of the apparatus 102 employing an embodiment of the present disclosure and executed by the processing circuitry 106. As will be appreciated, any such computer program instructions can be loaded onto a computer or other programmable apparatus (for example, hardware) to produce a machine, such that the resulting computer or other programmable apparatus implements the functions specified in the flowchart blocks. These computer program instructions can also be stored in a computer-readable memory that can direct a computer or other programmable apparatus to function in a particular manner, such that the instructions stored in the computer-readable memory produce an article of manufacture the execution of which implements the function specified in the flowchart blocks. The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Referring now to FIG. 2, the operations performed, such as by the apparatus 102 of FIG. 1, in order to provide for generating a transition variability index related to autonomous driving, in accordance with one or more embodiments of the present disclosure. As shown in block 202 of FIG. 2, the apparatus 102 includes means, such as the processing circuitry 106, the memory 108, or the like, configured to calculate a first transition variability index indicative of a first degree of variability in relation to transition of vehicles from respective autonomous levels while traveling proximate a first spatial reference point during different intervals of time. The first spatial reference point can be a portion of a road segment and/or a geographic area. For example, in an embodiment, the first spatial reference point can be a location point on a road segment. In another embodiment, the first spatial reference point can be a geometric shape that represents at least a portion of a road segment. In yet another embodiment, the first spatial reference point can be a geometric shape that represents an area that includes one or more road segments. In a non-limiting example, the first spatial reference point can be a tile (e.g., a grid cell, a square area, a rectangular area, etc.) associated with one or more portions of one or more road segments and/or a geographic area. For example, the first spatial reference point can be a tile (e.g., a grid cell, a square area, a rectangular area, etc.) associated with a 500 meter by 500 meter geographic area. In another non-limiting example, the first spatial reference point can be a polygon associated with one or more portions of one or more road segments and/or a geographic area. In yet another non-limiting example, the first spatial reference point can be a line associated with one or more portions of one or more road segments and/or a geographic area. However, it is to be appreciated that, in one or more embodiments, the first spatial reference point can be another geometric shape associated with one or more portions of one or more road segments and/or a geographic area.

Additionally, the first spatial reference point can be an autonomous transition region. For example, the first spatial reference point can be a region of one or more road segments where an autonomous level for vehicles is likely to change. In certain embodiments, the apparatus 102, such as the processing circuitry 106, can be configured to designate a cluster as the first spatial reference point in response to a determination that a minimum number of vehicles is within the first spatial reference point or within a certain distance from the first spatial reference point. Furthermore, the apparatus 102, such as the processing circuitry 106, can be configured to employ criterion associated with distance to determine the first spatial reference point. For example, the apparatus 102, such as the processing circuitry 106, can be configured to initially set the first spatial reference point to correspond to a certain size (e.g., 30 meters in size). Furthermore, in certain embodiments, the apparatus 102, such as the processing circuitry 106, can be configured to dynamically alter a size of the first spatial reference point based on a number of vehicles in the autonomous transition region and/or other conditions associated with the autonomous transition region.

FIG. 3 illustrates a map 300 divided into autonomous transition regions. For example, the map 300 includes at least an autonomous transition region 302. In one or more embodiments, the autonomous transition region 302 can correspond to the first spatial reference point. In an embodiment, the autonomous transition region 302 can be a tile cell or a grid cell. In a non-limiting example, the autonomous transition region 302 can be a 2 kilometer by 2 kilometer tile cell. However, it is to be appreciated that the autonomous transition region 302 can be a different shape and/or a different size. In one or more embodiments, the apparatus 102, such as the processing circuitry 106, can be configured to determine the first transition variability index for the autonomous transition region 302 per time epoch (e.g., every hour, every 15 minutes, etc.). In one or more embodiments, the apparatus 102, such as the processing circuitry 106, can be configured to calculate the first transition variability index for the autonomous transition region 302 based on a number of vehicles that change an autonomous level during the time epoch, a freshness (e.g., temporal dimension) of transition confidence data from vehicles, a distance of a vehicle from a centroid of the autonomous transition region 302, a transition vehicle trustworthiness score (e.g., based on a vehicle make or model), and/or other data associated with the autonomous transition region 302 and/or vehicles within the autonomous transition region 302.

The first transition variability index can provide an indication regarding how volatile an autonomous level transition reason is for the first spatial reference point. The autonomous level transition reason can be, for example, one or more reasons why the vehicles transitioned from respective autonomous levels while traveling proximate the first spatial reference point during the different intervals of time. In an embodiment, the autonomous level transition reason can be one or more reasons why one or more of the vehicles disengaged from particular levels of defined autonomy while traveling proximate the first spatial reference point during the different intervals of time. Additionally or alternatively, the autonomous level transition reason can be one or more reasons why one or more of the vehicles engaged into particular levels of defined autonomy while traveling proximate the first spatial reference point during the different intervals of time. In one or more embodiments, the apparatus 102, such as the processing circuitry 106, can be configured to perform a normalization process for the first transition variability index to adjust respective volatility index values for the first transition variability index to a common scale.

In one or more embodiments, the autonomous level transition reason can include a decrease in communication signal strength (e.g. loss of a 5G signal) for one or more of the vehicles traveling proximate the first spatial reference point during the different intervals of time. For example, in one or more embodiments the apparatus 102, such as the processing circuitry 106, can be configured to calculate a transition variability index that is indicative of a transition from a particular autonomous level due to a decrease in a strength of a communication signal associated with a vehicle while traveling proximate the first spatial reference point. The autonomous level transition reason can additionally or alternatively include a road condition (e.g., road construction, high pedestrian traffic, etc.) being present at the first spatial reference point while one or more of the vehicles traveled proximate the first spatial reference point during the different intervals of time. For example, in one or more embodiments the apparatus 102, such as the processing circuitry 106, can be configured to calculate a transition variability index that is indicative of transition from a particular autonomous level due to satisfaction of a particular road condition while traveling proximate the first spatial reference point. Additionally or alternatively, in one or more embodiments the apparatus 102, such as the processing circuitry 106, can be configured to calculate a transition variability index for a vehicle that is disengaged from a particular autonomous level due to the first spatial reference point satisfying a particular traffic condition while traveling along the first spatial reference point. Additionally or alternatively, in one or more embodiments the apparatus 102, such as the processing circuitry 106, can be configured to calculate a transition variability index for a first vehicle that is disengaged from a particular autonomous level due to the first spatial reference point satisfying a pedestrian traffic condition while traveling along the first spatial reference point. The autonomous level transition reason can additionally or alternatively include a particular environmental condition (e.g., a particular weather condition, etc.) present at the first spatial reference point while one or more of the vehicles traveled proximate the first spatial reference point during the different intervals of time. Furthermore, it is to be appreciated that, in one or more embodiments, the autonomous level transition reason can additionally or alternatively include a different type of reason associated with transition of vehicles from respective autonomous levels while traveling proximate a first spatial reference point during different intervals of time.

In one or more embodiments, the apparatus 102, such as the processing circuitry 106, can be configured to employ an average of differences across the different intervals of time as a measure of variability. For example, in one or more embodiments, the apparatus 102, such as the processing circuitry 106, can be configured to compute an average difference based on historical road condition transition scores $RWDS_1$, $RWDS_2$, $RWDS_3$, $RWDS_4$, $RWDS_5$ ... $RWDS_n$ for the first spatial reference point (e.g., spatial reference point A), where a road condition transition variability index (e.g., road_condition_TVI_1) corresponds to the following equation associated with the first spatial reference point:

$$\text{road\_condition\_TVI\_1} = \sum_{i=0}^{i=n-1} (|RWDS_i - RWDS_{i+1}|)/n$$

In another example, the apparatus 102, such as the processing circuitry 106, can be configured to additionally or alternatively compute an average difference based on historical communication signal strength transition scores $L5G_1$, $L5G_2$, $L5G_3$, $L5G_4$, $L5G_5$ ... $L5G_n$ for the first spatial reference point (e.g., spatial reference point A), where a communication signal strength transition variability index (e.g., communication_signal_strength_TVI_1) corresponds to the following equation associated with the first spatial reference point:

$$\text{communication\_signal\_strength\_TVI\_1} = \sum_{i=0}^{i=n-1} (|L5G_i - L5G_{i+1}|)/n$$

In another example, the apparatus 102, such as the processing circuitry 106, can be configured to additionally or alternatively compute an average difference based on historical high pedestrian transition scores $HP_1$, $HP_2$, $HP_3$, $HP_4$, $HP_5$ ... $HP_n$ for the first spatial reference point (e.g., spatial reference point A), where a high pedestrian transition variability index (e.g., HP_TVI_1) corresponds to the following equation associated with the first spatial reference point:

$$\text{HP\_TVI\_1} = \sum_{i=0}^{i=n-1} (|HP_i - HP_{i+1}|)/n$$

In one or more embodiments, the apparatus 102, such as the processing circuitry 106, can be configured to generate the first transition variability index (e.g., a transition from a particular autonomous level to another autonomous level) based on autonomous level data and/or location data thereof associated with the vehicles associated with the first spatial reference point. For example, in one or more embodiments, the apparatus 102, such as the processing circuitry 106, can be configured to identify the autonomous level data based on a change in an autonomous level for the vehicles associated with the first spatial reference point. In one or more embodiments, the apparatus 102, such as the processing circuitry 106, can be configured to receive the autonomous level data and/or the location data (e.g., from the vehicle) in response to the change in the autonomous level for the vehicles associated with the first spatial reference point. In one or more embodiments, the apparatus 102, such as the processing circuitry 106, can be configured to receive the autonomous level data and/or the location data from a database. In various embodiments, the change in the autonomous level for the vehicle can be determined and/or initiated by a processor (e.g., the processing circuitry 106 or other processing circuitry) of the vehicle. The change in the autonomous level for the vehicles associated with the first spatial reference point can be, for example, an increase in the autonomous level for the vehicle or a decrease in the autonomous level for the vehicle. For example, the change in the autonomous level for the vehicles associated with the first spatial reference point can be a transition of an autonomous level for the vehicle.

The autonomous level data associated with the first transition variability index can include an autonomous level indicative of a level of defined autonomy (e.g., a degree of autonomous driving) associated with the vehicle. For instance, the autonomous level data associated with the first transition variability index can include an indication of a particular autonomous level for the vehicle associated with the change in the autonomous level. In certain embodiments, the autonomous level data associated with the first transition variability index can include a first indication of a first autonomous level for the vehicle prior to the change in the autonomous level and a second indication of a second autonomous level for the vehicle after the change in the autonomous level. In certain embodiments, the autonomous level data associated with the first transition variability index can include an indication of an increase or a decrease in the autonomous level for the vehicle after the change in the autonomous level. In an example, the level of defined autonomy indicated by the autonomous level data can include Level 0 that corresponds to no automation for the vehicle, Level 1 that corresponds to a certain degree of driver assistance for the vehicle, Level 2 that corresponds to partial automation for the vehicle, Level 3 that corresponds to conditional automation for the vehicle, Level 4 that corresponds to high automation for the vehicle, Level 5 that corresponds to full automation for the vehicle, and/or another sub-level associated with a degree of autonomous driving for the vehicle. In an embodiment, the autonomous level data associated with the first transition variability index can include first autonomous level data indicative of a first level of defined autonomy of the vehicle before the change in the autonomous level for the vehicle. Additionally or alternatively, the autonomous level data associated with the first transition variability index can include second autonomous level data indicative of a second level of defined autonomy of the vehicle after the change in the autonomous level for the vehicle. For example, in an embodiment the autonomous level data associated with the first transition variability index can include an indication of the autonomous-level that the vehicle changed from (e.g., Level 3) and/or an indication of the autonomous-level that the vehicle changed to (e.g., Level 2).

Autonomous driving has become a focus of recent technology with recent advances in machine learning, computer vision, and computing power able to conduct real-time mapping and sensing of a vehicle's environment. Such an understanding of the environment enables autonomous driving in two distinct ways. Primarily, real-time or near real-time sensing of the environment can provide information about potential obstacles, the behavior of others on the roadway, and areas that are navigable by the vehicle. An understanding of the location of other vehicles and/or what the other vehicles have done and may be predicted to do may be useful for a vehicle (or apparatus 102) to safely plan a route.

Autonomous vehicles or vehicles with some level of autonomous controls provide some degree of vehicle control that was previously performed by a person driving a vehicle. Removing some or all of the responsibilities of driving from a person and automating those responsibilities require a high degree of confidence in performing those responsibilities in a manner at least as good as a human driver. For example, maintaining a vehicle's position within a lane by a human involves steering the vehicle between observed lane markings and determining a lane when lane markings are faint, absent, or not visible due to weather (e.g., heavy rain, snow, bright sunlight, etc.). As such, it is desirable for the autonomous vehicle to be equipped with sensors sufficient to observe road features, and a controller that is capable of processing the signals from the sensors observing the road features, interpret those signals, and provide vehicle control to maintain the lane position of the vehicle based on the sensor data. Maintaining lane position is merely one illustrative example of a function of autonomous or semi-autonomous vehicles that demonstrates the sensor level and complexity of autonomous driving. However, autonomous vehicle capabilities, particularly in fully autonomous vehicles, must be capable of performing all driving functions. As such, the vehicles must be equipped with sensor packages that enable the functionality in a safe manner.

The location data associated with the first spatial reference point can include information associated with a geographic location of the vehicles associated with the first spatial reference point. For instance, the location data can include geographic coordinates for the vehicle. In an embodiment, the location data associated with the first spatial reference point can include latitude data and/or longitude data defining the location of the vehicles associated with the first spatial reference point. In an aspect, the apparatus 102, such as the processing circuitry 106, can receive the location data associated with the first spatial reference point from the one or more sensors 112. For example, in an embodiment, the apparatus 102, such as the processing circuitry 106, can receive the location data associated with the first spatial reference point from a GPS or other location sensor of the vehicles associated with the first spatial reference point. In another embodiment, the apparatus 102, such as the processing circuitry 106, can receive the location data associated with the first spatial reference point from a LiDAR sensor of the vehicles associated with the first spatial reference point. In yet another embodiment, the apparatus 102, such as the processing circuitry 106, can receive the location data associated with the first spatial reference point from one or more ultrasonic sensors and/or one or more infrared sensors of the vehicles associated with the first spatial reference point. Additionally, in one or more embodiments, the location data associated with the first spatial reference point can include information associated with the change in the autonomous level for the vehicles associated with the first spatial reference point. For instance, in an embodiment, the location data associated with the first spatial reference point can include first location data associated with a decision by a processor (e.g., the processing circuitry 106 or other processing circuitry) of the vehicles to initiate the change in the autonomous level for the vehicles. Additionally or alternatively, the location data can include second location data associated with execution of the change in the autonomous level by a processor (e.g., the processing circuitry 106 or other processing circuitry) of the vehicles.

In certain embodiments, the apparatus 102, such as the processing circuitry 106, can be configured to additionally receive time data associated with the vehicle associated with the first spatial reference point. The time data can be associated with the change in the autonomous level for the vehicles associated with the first spatial reference point. In one or more embodiments, the apparatus 102, such as the processing circuitry 106, can be configured to receive first time data associated with the decision to initiate the change in the autonomous level for the vehicles associated with the first spatial reference point. Additionally or alternatively, in one or more embodiments, the apparatus 102, such as the processing circuitry 106, can be configured to receive second time data associated with the execution of the change in the autonomous level for the vehicles associated with the first spatial reference point. In certain embodiments, the apparatus 102, such as the processing circuitry 106, can be configured to additionally receive vehicle version data associated with one or more components of the vehicles associated with the first spatial reference point that facilitate autonomous driving of the vehicles associated with the first spatial reference point. In certain embodiments, the apparatus 102, such as the processing circuitry 106, can be configured to additionally receive vehicle data associated with a vehicle type for the vehicles associated with the first spatial reference point. In certain embodiments, the apparatus 102, such as the processing circuitry 106, can be configured to additionally receive vehicle context data associated with a reason for the transition in the autonomous level for the vehicles associated with the first spatial reference point. In one or more embodiments, the apparatus 102, such as the processing circuitry 106, can be configured to receive the time data (e.g., the first time data and/or the second time data), the vehicle version data, the vehicle data and/or the vehicle context data (e.g., from the vehicle) in response to the change in the autonomous level for the vehicles associated with the first spatial reference point. In one or more embodiments, the apparatus 102, such as the processing circuitry 106, can be configured to receive the time data (e.g., the first time data and/or the second time data), the vehicle version data, the vehicle data and/or the vehicle context data from a database.

An example of the vehicle associated with the first spatial reference point is depicted in FIG. 4. As shown in FIG. 4, a vehicle 400 travels along a road segment 402. In one or more embodiments, the vehicle 400 can be an automobile where tires of the vehicle 400 are in contact with a road surface of the road segment 402. In an exemplary embodiment, the vehicle 400 can be associated with a first level of defined autonomy (e.g., Level 3) at a first time (e.g., TIME A shown in FIG. 4). Furthermore, at the first time (e.g., TIME A), the vehicle 400 can be associated with a first location (e.g., a particular latitude and/or longitude). In certain embodiments, the vehicle 400 (e.g., a processor of the vehicle 400) can initiate a change (e.g., a transition) in the autonomous level for the vehicle 400. For example, at the first time (e.g., TIME A shown in FIG. 4), the vehicle 400 can initiate the change in the autonomous level. Additionally, at a second time (e.g., TIME B shown in FIG. 4), the vehicle 400 can be associated with a second level of defined autonomy (e.g., Level 2). Furthermore, at the second time (e.g., TIME B), the vehicle 400 can be associated with a second location (e.g., a different latitude and/or longitude).

As shown in block 204 of FIG. 2, the apparatus 102 includes means, such as the processing circuitry 106, the memory 108, or the like, configured to calculate a second transition variability index indicative of a second degree of variability in relation to transition of vehicles from respective autonomous levels while traveling along proximate a second spatial reference point during the different intervals of time. An example of a vehicle associated with the second spatial reference point can correspond to the vehicle 400 depicted in FIG. 4. The second spatial reference point can be a portion of a road segment and/or a geographic area that is different than the first spatial reference point. For example, in an embodiment, the second spatial reference point can be a location point on a road segment that is different than the first spatial reference point. In another embodiment, the second spatial reference point can be a geometric shape that represents at least a portion of a road segment. In yet another embodiment, the second spatial reference point can be a geometric shape that represents an area that includes one or more road segments. In a non-limiting example, the second spatial reference point can be a tile (e.g., a grid cell, a square area, a rectangular area, etc.) associated with one or more portions of one or more road segments and/or a geographic area. For example, the second spatial reference point can be a tile (e.g., a grid cell, a square area, a rectangular area, etc.) associated with a 500 meter by 500 meter geographic area. In another non-limiting example, the second spatial reference point can be a polygon associated with one or more portions of one or more road segments and/or a geographic area. In yet another non-limiting example, the second spatial reference point can be a line associated with one or more portions of one or more road segments and/or a geographic area. However, it is to be appreciated that, in one or more embodiments, the second spatial reference point can be another geometric shape associated with one or more portions of one or more road segments and/or a geographic area.

Additionally, the second spatial reference point can be an autonomous transition region that is different than the autonomous transition region associated with the first spatial reference point. For example, the second spatial reference point can be a region of one or more road segments where an autonomous level for vehicles is likely to change. In certain embodiments, the apparatus 102, such as the processing circuitry 106, can be configured to designate a cluster as the second spatial reference point in response to a determination that a minimum number of vehicles is within the second spatial reference point or within a certain distance from the second spatial reference point. Furthermore, the apparatus 102, such as the processing circuitry 106, can be configured to employ criterion associated with distance to determine the second spatial reference point. For example, the apparatus 102, such as the processing circuitry 106, can be configured to initially set the second spatial reference point to correspond to a certain size (e.g., 30 meters in size). Furthermore, in certain embodiments, the apparatus 102, such as the processing circuitry 106, can be configured to dynamically alter a size of the second spatial reference point based on a number of vehicles in the autonomous transition region and/or other conditions associated with the autonomous transition region.

Referring back to FIG. 3, the map 300 additionally includes an autonomous transition region 304. In one or more embodiments, the autonomous transition region 304 can correspond to the second spatial reference point. Furthermore, the autonomous transition region 304 can correspond to a different geographic area than the autonomous transition region 302 associated with the first spatial reference point. In an embodiment, the autonomous transition region 304 can be a tile cell or a grid cell. In a non-limiting example, the autonomous transition region 304 can be a 2 kilometer by 2 kilometer tile cell. However, it is to be appreciated that the autonomous transition region 304 can be a different shape and/or a different size. In one or more embodiments, the apparatus 102, such as the processing circuitry 106, can be configured to determine the second transition variability index for the autonomous transition region 304 per time epoch (e.g., every hour, every 15 minutes, etc.). In one or more embodiments, the apparatus 102, such as the processing circuitry 106, can be configured to calculate the second transition variability index for the autonomous transition region 304 based on a number of vehicles that change an autonomous level during the time epoch, a freshness (e.g., temporal dimension) of transition confidence data from vehicles, a distance of a vehicle from a centroid of the autonomous transition region 304, a transition vehicle trustworthiness score (e.g., based on a vehicle make or model), and/or other data associated with the autonomous transition region 304 and/or vehicles within the autonomous transition region 304.

The second transition variability index can provide an indication regarding how volatile an autonomous level transition reason is for the second spatial reference point. The autonomous level transition reason can be, for example, one or more reasons why the vehicles transitioned from respective autonomous levels while traveling proximate the second spatial reference point during the different intervals of time. In an embodiment, the autonomous level transition reason can be one or more reasons why one or more of the vehicles disengaged from particular levels of defined autonomy while traveling proximate the second spatial reference point during the different intervals of time. Additionally or alternatively, the autonomous level transition reason can be one or more reasons why one or more of the vehicles engaged into particular levels of defined autonomy while traveling proximate the second spatial reference point during the different intervals of time. In one or more embodiments, the apparatus 102, such as the processing circuitry 106, can be configured to perform a normalization process for the second transition variability index to adjust respective volatility index values for the second transition variability index to a common scale.

In one or more embodiments, the autonomous level transition reason can include a decrease in communication signal strength (e.g. loss of a 5G signal) for one or more of the vehicles traveling proximate the second spatial reference point during the different intervals of time. For example, in one or more embodiments the apparatus 102, such as the processing circuitry 106, can be configured to calculate a transition variability index that is indicative of a transition from a particular autonomous level due to a decrease in a strength of a communication signal associated with a vehicle while traveling proximate the second spatial reference point. The autonomous level transition reason can additionally or alternatively include a road condition (e.g., road construction, high pedestrian traffic, etc.) being present at the second spatial reference point while one or more of the vehicles traveled proximate the second spatial reference point during the different intervals of time. For example, in one or more embodiments the apparatus 102, such as the processing circuitry 106, can be configured to calculate a transition variability index that is indicative of transition from a particular autonomous level due to satisfaction of a particular road condition while traveling proximate the second spatial reference point. Additionally or alternatively, in one or more embodiments the apparatus 102, such as the processing circuitry 106, can be configured to calculate a transition variability index for a vehicle that is disengaged from a particular autonomous level due to the second spatial reference point satisfying a particular traffic condition while traveling along the second spatial reference point. Additionally or alternatively, in one or more embodiments the apparatus 102, such as the processing circuitry 106, can be configured to calculate a transition variability index for a second vehicle that is disengaged from a particular autonomous level due to the second spatial reference point satisfying a pedestrian traffic condition while traveling along the second spatial reference point. The autonomous level transition reason can additionally or alternatively include a particular environmental condition (e.g., a particular weather condition, etc.) present at the second spatial reference point while one or more of the vehicles traveled proximate the second spatial reference point during the different intervals of time. Furthermore, it is to be appreciated that, in one or more embodiments, the autonomous level transition reason can additionally or alternatively include a different type of reason associated with transition of vehicles from respective autonomous levels while traveling proximate a second spatial reference point during different intervals of time.

In one or more embodiments, the apparatus 102, such as the processing circuitry 106, can be configured to employ an average of differences across the different intervals of time as a measure of variability. For example, in one or more embodiments, the apparatus 102, such as the processing circuitry 106, can be configured to compute an average difference based on historical road condition transition scores $RWDS_1$, $RWDS_2$, $RWDS_3$, $RWDS_4$, $RWDS_5$ ... $RWDS_n$ for the second spatial reference point (e.g., spatial reference point A), where a road condition transition variability index (e.g., road_condition_TVI_2) corresponds to the following equation associated with the second spatial reference point:

$$\text{road\_condition\_TVI\_2} = \sum_{i=0}^{i=n-1} (|RWDS_i - RWDS_{i+1}|)/n$$

In another example, the apparatus 102, such as the processing circuitry 106, can be configured to additionally or alternatively compute an average difference based on historical communication signal strength transition scores $L5G_1$, $L5G_2$, $L5G_3$, $L5G_4$, $L5G_5$ ... $L5G_n$ for the second spatial reference point (e.g., spatial reference point A), where a communication signal strength transition variability index (e.g., communication_signal_strength_TVI_2) corresponds to the following equation associated with the second spatial reference point:

$$\text{communication\_signal\_strength\_TVI\_2} = \sum_{i=0}^{i=n-1} (|L5G_i - L5G_{i+1}|)/n$$

In another example, the apparatus 102, such as the processing circuitry 106, can be configured to additionally or alternatively compute an average difference based on historical high pedestrian transition scores $HP_1$, $HP_2$, $HP_3$, $HP_4$, $HP_5$ ... $HP_n$ for the second spatial reference point (e.g., spatial reference point A), where a high pedestrian transition variability index (e.g., HP_TVI_2) corresponds to the following equation associated with the second spatial reference point:

$$\text{HP\_TVI\_2} = \sum_{i=0}^{i=n-1} (|HP_i - HP_{i+1}|)/n$$

In one or more embodiments, the apparatus 102, such as the processing circuitry 106, can be configured to generate the second transition variability index (e.g., a transition from a particular autonomous level to another autonomous level)

based on autonomous level data and/or location data thereof associated with the vehicles associated with the second spatial reference point. For example, in one or more embodiments, the apparatus 102, such as the processing circuitry 106, can be configured to identify the autonomous level data based on a change in an autonomous level for the vehicles associated with the second spatial reference point. In one or more embodiments, the apparatus 102, such as the processing circuitry 106, can be configured to receive the autonomous level data and/or the location data (e.g., from the vehicle) in response to the change in the autonomous level for the vehicles associated with the second spatial reference point. In one or more embodiments, the apparatus 102, such as the processing circuitry 106, can be configured to receive the autonomous level data and/or the location data from a database. In various embodiments, the change in the autonomous level for the vehicle can be determined and/or initiated by a processor (e.g., the processing circuitry 106 or other processing circuitry) of the vehicle. The change in the autonomous level for the vehicle can be, for example, an increase in the autonomous level for the vehicle or a decrease in the autonomous level for the vehicles associated with the second spatial reference point. For example, the change in the autonomous level for the vehicle can be a transition of an autonomous level for the vehicles associated with the second spatial reference point.

The autonomous level data associated with the second transition variability index can include an autonomous level indicative of a level of defined autonomy (e.g., a degree of autonomous driving) associated with the vehicle. For instance, the autonomous level data associated with the second transition variability index can include an indication of a particular autonomous level for the vehicle associated with the change in the autonomous level. In certain embodiments, the autonomous level data associated with the second transition variability index can include a first indication of a first autonomous level for the vehicle prior to the change in the autonomous level and a second indication of a second autonomous level for the vehicle after the change in the autonomous level. In certain embodiments, the autonomous level data associated with the second transition variability index can include an indication of an increase or a decrease in the autonomous level for the vehicle after the change in the autonomous level. In an example, the level of defined autonomy indicated by the autonomous level data can include Level 0 that corresponds to no automation for the vehicle, Level 1 that corresponds to a certain degree of driver assistance for the vehicle, Level 2 that corresponds to partial automation for the vehicle, Level 3 that corresponds to conditional automation for the vehicle, Level 4 that corresponds to high automation for the vehicle, Level 5 that corresponds to full automation for the vehicle, and/or another sub-level associated with a degree of autonomous driving for the vehicle. In an embodiment, the autonomous level data associated with the second transition variability index can include first autonomous level data indicative of a first level of defined autonomy of the vehicle before the change in the autonomous level for the vehicle. Additionally or alternatively, the autonomous level data associated with the second transition variability index can include second autonomous level data indicative of a second level of defined autonomy of the vehicle after the change in the autonomous level for the vehicle. For example, in an embodiment the autonomous level data associated with the second transition variability index can include an indication of the autonomous-level that the vehicle changed from (e.g., Level 3) and/or an indication of the autonomous-level that the vehicle changed to (e.g., Level 2).

The location data associated with the second spatial reference point can include information associated with a geographic location of the vehicles associated with the second spatial reference point. For instance, the location data can include geographic coordinates for the vehicle. In an embodiment, the location data associated with the second spatial reference point can include latitude data and/or longitude data defining the location of the vehicles associated with the second spatial reference point. In an aspect, the apparatus 102, such as the processing circuitry 106, can receive the location data associated with the second spatial reference point from the one or more sensors 112. For example, in an embodiment, the apparatus 102, such as the processing circuitry 106, can receive the location data associated with the second spatial reference point from a GPS or other location sensor of the vehicles associated with the second spatial reference point. In another embodiment, the apparatus 102, such as the processing circuitry 106, can receive the location data associated with the second spatial reference point from a LiDAR sensor of the vehicles associated with the second spatial reference point. In yet another embodiment, the apparatus 102, such as the processing circuitry 106, can receive the location data associated with the second spatial reference point from one or more ultrasonic sensors and/or one or more infrared sensors of the vehicles associated with the second spatial reference point. Additionally, in one or more embodiments, the location data associated with the second spatial reference point can include information associated with the change in the autonomous level for the vehicles associated with the second spatial reference point. For instance, in an embodiment, the location data associated with the second spatial reference point can include first location associated with a decision by a processor (e.g., the processing circuitry 106 or other processing circuitry) of the vehicles to initiate the change in the autonomous level for the vehicles. Additionally or alternatively, the location data can include second location data associated with execution of the change in the autonomous level by a processor (e.g., the processing circuitry 106 or other processing circuitry) of the vehicles.

In certain embodiments, the apparatus 102, such as the processing circuitry 106, can be configured to additionally receive time data associated with the vehicles associated with the second spatial reference point. The time data can be associated with the change in the autonomous level for the vehicles associated with the second spatial reference point. In one or more embodiments, the apparatus 102, such as the processing circuitry 106, can be configured to receive first time data associated with the decision to initiate the change in the autonomous level for the vehicles associated with the second spatial reference point. Additionally or alternatively, in one or more embodiments, the apparatus 102, such as the processing circuitry 106, can be configured to receive second time data associated with the execution of the change in the autonomous level for the vehicles associated with the second spatial reference point. In certain embodiments, the apparatus 102, such as the processing circuitry 106, can be configured to additionally receive vehicle version data associated with one or more components of the vehicles associated with the second spatial reference point that facilitate autonomous driving of the vehicles associated with the second spatial reference point. In certain embodiments, the apparatus 102, such as the processing circuitry 106, can be configured to additionally receive vehicle data associated with a vehicle type for the vehicles associated with the second spatial reference point. In certain embodiments, the apparatus 102, such as the processing circuitry 106, can be configured to additionally receive vehicle context data associated with a reason for the transition in the autonomous level for the vehicles associated with the second spatial reference point. In one or more embodiments, the apparatus 102, such as the processing circuitry 106, can be configured to receive the time data (e.g., the first time data and/or the second time data), the vehicle version data, the vehicle data and/or the vehicle context data (e.g., from the vehicle) in response to the change in the autonomous level for the vehicles associated with the second spatial reference point. In one or more embodiments, the apparatus 102, such as the processing circuitry 106, can be configured to receive the time data (e.g., the first time data and/or the second time data), the vehicle version data, the vehicle data and/or the vehicle context data from a database.

As shown in block 206 of FIG. 2, the apparatus 102 includes means, such as the processing circuitry 106, the memory 108, or the like, configured to prioritize updating of transition data (e.g., a transition variability index) associated with one of the first and second spatial reference points relative to another one of the first and second spatial reference points based on a comparison between the first transition variability index for the first spatial reference point and the second transition variability index for the second spatial reference point. For instance, as shown in FIG. 5, a spatial reference point 502 is associated with a transition variability index 504. Furthermore, a spatial reference point 506 is associated with a transition variability index 508. In an example, the spatial reference point 502 can correspond to the first spatial reference point (e.g., the autonomous transition region 302) and the spatial reference point 506 can correspond to the second spatial reference point (e.g., the autonomous transition region 304). Furthermore, the transition variability index 504 can correspond to the first transition variability index (e.g., the first transition variability index calculated by the apparatus 102, such as the processing circuitry 106) and the transition variability index 508 can correspond to the second transition variability index (e.g., the second transition variability index calculated by the apparatus 102, such as the processing circuitry 106).

According to one or more embodiments, the apparatus 102, such as the processing circuitry 106, can be configured to perform a comparison 510 between the transition variability index 504 and the transition variability index 508. For example, according to one or more embodiments, the apparatus 102, such as the processing circuitry 106, can be configured to perform the comparison 510 to determine whether the transition variability index 504 or the transition variability index 508 is greater (e.g., whether the transition variability index 504 or the transition variability index 508 is indicative of greater variability). In an embodiment, the apparatus 102, such as the processing circuitry 106, can be configured to update the transition data for the first spatial reference point (e.g., the spatial reference point 502) prior to the transition data for the second spatial reference point (e.g., the spatial reference point 506) in response to a determination that the first transition variability index (e.g., the transition variability index 504) for the first spatial reference point is indicative of greater variability than the second transition variability index (e.g., the transition variability index 508) for the second spatial reference point. For example, the apparatus 102, such as the processing circuitry 106, can be configured to process and/or update the first spatial reference point (e.g., the spatial reference point 502) with new transition data, new disengagement data, new engagement data, new autonomous level data, new location data, new time data, new vehicle version data, new vehicle data, new vehicle context data, and/or other transition data for vehicles associated with the first spatial reference point (e.g., the spatial reference point 502) in response to a determination that the first transition variability index (e.g., the transition variability index 504) for the first spatial reference point is indicative of greater variability than the second transition variability index (e.g., the transition variability index 508) for the second spatial reference point. In another embodiment, the apparatus 102, such as the processing circuitry 106, can be configured to update the transition data for the second spatial reference point (e.g., the spatial reference point 506) prior to the transition data for the first spatial reference point (e.g., the spatial reference point 502) in response to a determination that the second transition variability index (e.g., the transition variability index 508) for the second spatial reference point is indicative of greater variability than the first transition variability index (e.g., the transition variability index 504) for the first spatial reference point. For example, the apparatus 102, such as the processing circuitry 106, can be configured to process and/or update the second spatial reference point (e.g., the spatial reference point 506) with new transition data, new disengagement data, new engagement data, new autonomous level data, new location data, new time data, new vehicle version data, new vehicle data, new vehicle context data, and/or other transition data for vehicles associated with the second spatial reference point (e.g., the spatial reference point 506) in response to a determination that the first transition variability index (e.g., the transition variability index 508) for the second spatial reference point is indicative of greater variability than the first transition variability index (e.g., the transition variability index 504) for the first spatial reference point.

In certain embodiments, to facilitate generation of the first transition variability index associated with the first spatial reference point and/or the second transition variability index associated with the second spatial reference point, the apparatus 102 can support a mapping, navigation, and/or autonomous driving application so as to present maps or otherwise provide navigation or driver assistance, such as in an example embodiment in which map data is created or updated using methods described herein. For example, the apparatus 102 can provide for display of a map and/or instructions for following a route within a network of roads via a user interface (e.g., a graphical user interface). In order to support a mapping application, the apparatus 102 can include or otherwise be in communication with a geographic database, such as map database 104, a geographic database stored in the memory 108, and/or map database 610 shown in FIG. 6. For example, the geographic database can include node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology can be used, such as electronic horizon sensors, radar, LiDAR, ultrasonic sensors and/or infrared sensors. In one or more embodiments, the other autonomous level data can be stored in the map database 104, the map database 610, and/or another database accessible by the apparatus 102.

In one or more embodiments, the apparatus 102, such as the processing circuitry 106, can be configured to calculate the first transition variability index associated with the first spatial reference point and/or the second transition variability index associated with the second spatial reference point based on aggregated autonomous level data. For example, in one or more embodiments, the apparatus 102, such as the processing circuitry 106, can be configured to calculate the first transition variability index associated with the first spatial reference point and/or the second transition variability index associated with the second spatial reference point based on a vehicle make/model, a previous autonomous level, a current autonomous level, a decision location, a decision time, an execution location, an execution time, version info and/or a reason. In one or more embodiments, the vehicle make/model can be an identifier for a vehicle make and/or a vehicle model. The previous autonomous level can be an indication of an autonomous level from which a vehicle changed from. The current autonomous level can be an indication of an autonomous level from which a vehicle changed to. The decision location can be a location in which a vehicle initiates a change in the autonomous level from the previous autonomous level to the current autonomous level. The decision time can include a time and/or a date (e.g., a timestamp) that indicates the time and/or the date in which a vehicle initiates a change in the autonomous level from the previous autonomous level to the current autonomous level. The execution location can be a location in which the autonomous level for the vehicle is changed to the current autonomous level. The execution time can include a time and/or a date (e.g., a timestamp) that indicates the time and/or the date in which the autonomous level for the vehicle is changed to the current autonomous level. The version info can indicate a version of software (e.g., firmware) and/or hardware related to autonomous driving (e.g., self-driving capabilities and/or decision) and/or vehicle navigation. The reason corresponds to the reason for the change in the autonomous level from the previous autonomous level to the current autonomous level. For example, the reason can include a user triggered reason (e.g., a reason not triggered by a drive strategy on the vehicle, but rather a driver), a drive strategy reason (e.g., an anticipated change up or down in an autonomous mode initiated by drive strategy such as, for example, a difficult road segment, road work, a construction zone, a toll plaza, etc.), a conflict-related reason (e.g., a conflict between map data and sensor observations), an environmental-related reason (e.g., weather related, etc.).

In example embodiments, a navigation system user interface and/or an autonomous driving user interface can be provided to provide driver assistance to a user traveling along a network of roadways where data collected from the vehicle (e.g., the vehicle 400) associated with the navigation system user interface can aid in establishing a position of the vehicle along a road segment (e.g., the road segment 402) and/or can provide assistance for autonomous or semi-autonomous vehicle control of the vehicle. Autonomous vehicle control can include driverless vehicle capability where all vehicle functions are provided by software and hardware to safely drive the vehicle along a path identified by the vehicle. Semi-autonomous vehicle control can be any level of driver assistance from adaptive cruise control, to lane-keep assist, or the like. Establishing vehicle location and position along a road segment can provide information useful to navigation and autonomous or semi-autonomous vehicle control by establishing an accurate and highly specific position of the vehicle on a road segment and even within a lane of the road segment such that map features in the map, e.g., a high definition (HD) map, associated with the specific position of the vehicle can be reliably used to aid in guidance and vehicle control.

A map service provider database can be used to provide driver assistance, such as via a navigation system and/or through an Advanced Driver Assistance System (ADAS) having autonomous or semi-autonomous vehicle control features. Referring back to FIG. 6, illustrated is a communication diagram of an example embodiment of a system for implementing example embodiments described herein. The illustrated embodiment of FIG. 6 includes a mobile device 604, which can be, for example, the apparatus 102 of FIG. 1, such as a mobile phone, an in-vehicle navigation system, an ADAS, or the like. The illustrated embodiment of FIG. 6 also includes a map data service provider 608. The mobile device 604 and the map data service provider 608 can be in communication via a network 612. The network 612 can be any form of wireless or partially wireless network as will be described further below. Additional, different, or fewer components can be provided. For example, many mobile devices 604 can connect with the network 612. In an embodiment, the map data service provider can be a cloud service. For instance, in certain embodiments, the map data service provider 608 can provide cloud-based services and/or can operate via a hosting server that receives, processes, and provides data to other elements of the system 600.

The map data service provider 608 can include a map database 610 that can include node data, road segment data or link data, point of interest (POI) data, traffic data or the like. In one embodiment, the map database 610 can be different than the map database 104. In another embodiment, at least a portion of the map database 610 can correspond to the map database 104. The map database 610 can also include cartographic data, routing data, and/or maneuvering data. According to some example embodiments, the road segment data records can be links or segments representing roads, streets, or paths, as can be used in calculating a route or recorded route information for determination of one or more personalized routes. The node data can be end points corresponding to the respective links or segments of road segment data. The road link data and the node data can represent a road network, such as used by vehicles, cars, trucks, buses, motorcycles, and/or other entities. Optionally, the map database 610 can contain path segment and node data records or other data that can represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 610 can include data about the POIs and their respective locations in the POI records. The map database 610 can include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 610 can include event data (e.g., traffic incidents, construction activities, scheduled events, unscheduled events, etc.) associated with the POI data records or other records of the map database 610.

The map database 610 can be maintained by the map data service provider 608 and can be accessed, for example, by a processing server 602 of the map data service provider 608. By way of example, the map data service provider 608 can collect geographic data and/or dynamic data to generate and enhance the map database 610. In one example, the dynamic data can include traffic-related data. There can be different ways used by the map data service provider 608 to collect data. These ways can include obtaining data from other sources, such as municipalities or respective geographic authorities, such as via global information system databases. In addition, the map data service provider 608 can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that can be available is vehicle data provided by vehicles, such as provided, e.g., as probe points, by mobile device 604, as they travel the roads throughout a region.

In certain embodiments, at least a portion of the map database 104 can be included in the map database 610. In an embodiment, the map database 610 can be a master map database, such as an HD map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems. For example, geographic data can be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 604, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map database 610 of the map data service provider 608 can be a master geographic database, but in alternate embodiments, a client side map database can represent a compiled navigation database that can be used in or with end user devices (e.g., mobile device 604) to provide navigation and/or map-related functions. For example, the map database 610 can be used with the mobile device 604 to provide an end user with navigation features. In such a case, the map database 610 can be downloaded or stored on the end user device which can access the map database 610 through a wireless or wired connection, such as via a processing server 602 and/or the network 612, for example.

In one embodiment, as noted above, the end user device or mobile device 604 can be embodied by the apparatus 102 of FIG. 1 and can include an ADAS which can include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, a server and/or other device that can perform navigation-related functions, such as digital routing and map display. An end user can use the mobile device 604 for navigation and map functions such as guidance and map display, for example, and for determination of useful driver assistance information, according to some example embodiments.

In certain embodiments, the apparatus 102, such as the processing circuitry 106, can be configured to aggregate the autonomous level data with other autonomous level data based on a density-based clustering technique, such as, for example, density-based spatial clustering of applications with noise (DB-SCAN). For example, in one or more embodiments, the apparatus 102, such as the processing circuitry 106, can be configured to aggregate locations associated with a change in an autonomous level via distance using the DB-SCAN. In an embodiment, the apparatus 102, such as the processing circuitry 106, can be configured to employ a first input parameter (e.g., the minimum number of vehicles required to form a road segment region) and/or a second input parameter (e.g., the distance between the vehicles for the vehicles to be considered related) to form a cluster.

In one or more embodiments, the apparatus 102, such as the processing circuitry 106, can be configured to calculate a transition variability index that includes first variability data and second variability data. For instance, the first variability data can be associated with a first degree of variability in relation to transition of vehicles from respective autonomous levels while traveling proximate a first spatial reference point during different intervals of time. Furthermore, the second variability data can be associated with a second degree of variability in relation to transition of vehicles from respective autonomous levels while traveling along proximate a second spatial reference point during the different intervals of time. As such, in one or more embodiments, a transition variability index can include two or more transition variability indexes associated with two or more spatial reference points. In an embodiment, the apparatus 102, such as the processing circuitry 106, can be configured to update the transition data for the first spatial reference point prior to the transition data for the second spatial reference point in response to a determination that the first variability data for the first spatial reference point is indicative of greater variability than the second variability data for the second spatial reference point. In another embodiment, the apparatus 102, such as the processing circuitry 106, can be configured to update the transition data for the second spatial reference point prior to the transition data for the first spatial reference point in response to a determination that the second variability data for the second spatial reference point is indicative of greater variability than the first variability data for the first spatial reference point.

As shown in block 208 of FIG. 2, the apparatus 102 includes means, such as the processing circuitry 106, the memory 108, or the like, configured to encode the transition data that has been updated for the one of the first and second spatial reference points in a database to facilitate autonomous driving proximate the one of the first and second spatial reference points. For instance, in an embodiment, the apparatus 102, such as the processing circuitry 106, can be configured to encode the transition data (e.g., new transition data, new disengagement data, new engagement data, new autonomous level data, new location data, new time data, new vehicle version data, new vehicle data, new vehicle context data, and/or other transition data) for the first spatial reference point (e.g., the spatial reference point 502) in a database to facilitate autonomous driving proximate the first spatial reference point. In one or more embodiments, the transition data for the first spatial reference point can be encoded into the map database 104, the map database 410, and/or another database accessible by the apparatus 102.

In one or more embodiments, the apparatus 102, such as the processing circuitry 106, can be additionally or alternatively configured to facilitate routing of a vehicle associated with the first spatial reference point based on the transition data that has been updated for the first spatial reference point. In one or more embodiments, the apparatus 102, such as the processing circuitry 106, can be additionally or alternatively configured to facilitate routing of a vehicle associated with the second spatial reference point based on the transition data that has been updated for the second spatial reference point. In one or more embodiments, the apparatus 102, such as the processing circuitry 106, can be additionally or alternatively configured to facilitate routing of a vehicle associated with the first spatial reference point based on user feedback provided in response to an indication to a user of the vehicle that the transition data for the first spatial reference point satisfies a defined criterion. For example, the apparatus 102, such as the processing circuitry 106, can be additionally or alternatively configured to facilitate routing of a vehicle associated with the first spatial reference point based on user feedback provided in response to an indication to a user of the vehicle that the transition data for the first spatial reference point indicates high variability. In one or more embodiments, the apparatus 102, such as the processing circuitry 106, can employ a threshold level that corresponds to high variability to determine whether the transition data for the first spatial reference point indicates high variability. In one or more embodiments, the apparatus 102, such as the processing circuitry 106, can be additionally or alternatively configured to facilitate routing of a vehicle associated with the second spatial reference point based on user feedback provided in response to an indication to a user of the vehicle that the transition data for the second spatial reference point satisfies a defined criterion. For example, the apparatus 102, such as the processing circuitry 106, can be additionally or alternatively configured to facilitate routing of a vehicle associated with the second spatial reference point based on user feedback provided in response to an indication to a user of the vehicle that the transition data for the second spatial reference point indicates high variability. In one or more embodiments, the apparatus 102, such as the processing circuitry 106, can employ a threshold level that corresponds to high variability to determine whether the transition data for the second spatial reference point indicates high variability. In one or more embodiments, the apparatus 102, such as the processing circuitry 106, can be additionally or alternatively configured to facilitate routing of a vehicle associated with the first spatial reference point and/or the second spatial reference point based on predefined preferences and/or predefined criteria associated with a user. In one or more embodiments, the apparatus 102, such as the processing circuitry 106, can be additionally or alternatively configured to facilitate routing of a vehicle associated with the first spatial reference point and/or the second spatial reference point based on predefined settings and/or predefined criteria associated with the vehicle. In one or more embodiments, the apparatus 102, such as the processing circuitry 106, can be additionally or alternatively configured to facilitate routing of a vehicle associated with the first spatial reference point and/or the second spatial reference point based on traffic data associated with the first spatial reference point and/or the second spatial reference (e.g., to regulate traffic associated with the first spatial reference point and/or the second spatial reference).

In an example, in response to a determination that the transition data for the first spatial reference point indicates high variability, the apparatus 102, such as the processing circuitry 106, can be configured to transmit a notification to a display of one or more vehicles such that a driver of the one or more vehicles can alter a route of the one or more vehicles to avoid one or more road segments associated with the first spatial reference point. In another example, in response to a determination that the transition data for the second spatial reference point indicates high variability, the apparatus 102, such as the processing circuitry 106, can be configured to transmit a notification to a display of one or more vehicles such that a driver of the one or more vehicles can alter a route of the one or more vehicles to avoid one or more road segments associated with the second spatial reference point. In another example, in response to a determination that the transition data for the first spatial reference point indicates high variability, the apparatus 102, such as the processing circuitry 106, can be configured to transmit one or more instructions to one or more vehicles (e.g., to an electronic control unit of the one or more vehicles) such that the one or more vehicles can alter a route of the one or more vehicles to avoid one or more road segments associated with the first spatial reference point. In another example, in response to a determination that the transition data for the second spatial reference point indicates high variability, the apparatus 102, such as the processing circuitry 106, can be configured to transmit one or more instructions to one or more vehicles (e.g., to an electronic control unit of the one or more vehicles) such that the one or more vehicles can alter a route of the one or more vehicles to avoid one or more road segments associated with the second spatial reference point.

In one or more embodiments, the apparatus 102, such as the processing circuitry 106, can be additionally or alternatively configured to cause rendering of data via a map display of one or more vehicles associated with the first spatial reference point and/or another spatial reference point based on the transition data that has been updated for the first spatial reference point. For example, in one or more embodiments, the apparatus 102, such as the processing circuitry 106, can be additionally or alternatively configured to render a certain type of visual indicator (e.g., a red color, a green color, a yellow color, etc.) via a map display of one or more vehicles associated with the first spatial reference point and/or another spatial reference point based on the transition data that has been updated for the first spatial reference point. In one or more embodiments, the apparatus 102, such as the processing circuitry 106, can be additionally or alternatively configured to cause rendering of data via a map display of one or more vehicles associated with the second spatial reference point and/or another spatial reference point based on the transition data that has been updated for the second spatial reference point. For example, in one or more embodiments, the apparatus 102, such as the processing circuitry 106, can be additionally or alternatively configured to render a certain type of visual indicator (e.g., a red color, a green color, a yellow color, etc.) via a map display of one or more vehicles associated with the second spatial reference point and/or another spatial reference point based on the transition data that has been updated for the second spatial reference point.

In one or more embodiments, the apparatus 102, such as the processing circuitry 106, can be additionally or alternatively configured to provide one or more activity recommendations (e.g., provide media content) to one or more computing devices associated with one or more vehicles proximate to the first spatial reference point and/or another spatial reference point based on the transition data that has been updated for the first spatial reference point. In one or more embodiments, the apparatus 102, such as the processing circuitry 106, can be additionally or alternatively configured to provide one or more activity recommendations (e.g., provide media content) to one or more computing devices associated with one or more vehicles proximate to the second spatial reference point and/or another spatial reference point based on the transition data that has been updated for the second spatial reference point.

In certain embodiments, the apparatus 102, such as the processing circuitry 106, can be configured to map the transition data for the first spatial reference point onto one or more map data layers of a map (e.g., an HD map) to facilitate the autonomous level prediction for vehicles associated with the first spatial reference point. For instance, in certain embodiments, the apparatus 102, such as the processing circuitry 106, can be configured to store the aggregated autonomous level data in a map data layer of a map (e.g., an HD map) for mapping purposes, navigation purposes, and/or autonomous driving purposes associated with the first spatial reference point. In certain embodiments, the apparatus 102, such as the processing circuitry 106, can be configured to store the transition data for the first spatial reference point in two or more map data layer of a map (e.g., an HD map) for mapping purposes, navigation purposes, and/or autonomous driving purposes associated with the first spatial reference point. For example, in an embodiment, transition data for a first type of vehicle model can be stored in a first map data layer associated with the first spatial reference point, transition data for a second type of vehicle model can be stored in a second map data layer associated with the first spatial reference point, etc. Additionally or alternatively, in an embodiment, transition data for a first location associated with the first spatial reference point can be stored in a first map data layer, transition data for a second location associated with the first spatial reference point can be stored in a second map data layer, etc. Additionally or alternatively, in an embodiment, transition data for a first time or date can be stored in a first map data layer associated with the first spatial reference point, transition data for a second time or date can be stored in a second map data layer associated with the first spatial reference point, etc. Additionally or alternatively, in an embodiment, transition data for a first type of vehicle version can be stored in a first map data layer associated with the first spatial reference point, transition data for a second type of vehicle version can be stored in a second map data layer associated with the first spatial reference point, etc. Additionally or alternatively, in an embodiment, transition data for a first type of reason can be stored in a first map data layer associated with the first spatial reference point, transition data for a second type of reason can be stored in a second map data layer associated with the first spatial reference point, etc. Additionally or alternatively, in an embodiment, transition data for vehicles traveling in a first direction with respect to a road segment associated with the first spatial reference point can be stored in a first map data layer, transition data for vehicles traveling in a first direction with respect to a road segment associated with the first spatial reference point can be stored in a second map data layer, etc. In certain embodiments, the apparatus 102, such as the processing circuitry 106, can be configured to link and/or associate the transition data with one or more portions, components, areas, layers, features, text, symbols, and/or data records of a map (e.g., an HD map) associated with the first spatial reference point.

In one or more embodiments, the apparatus 102, such as the processing circuitry 106, can be configured to generate a data point for a map layer associated with the first spatial reference point based on the transition data. The data point can indicate the transition of a autonomous level for vehicles associated with the first spatial reference point and/or a location associated with the transition of the autonomous levels for the vehicles associated with the first spatial reference point. Additionally or alternatively, in one or more embodiments, the apparatus 102, such as the processing circuitry 106, can be configured to store the data point in the database associated with a map layer associated with the first spatial reference point. The map layer associated with the first spatial reference point can include the data point and one or more other data points that indicate one or more other locations related to respective autonomous level transitions for one or more other vehicles associated with the first spatial reference point. In certain embodiments, the apparatus 102, such as the processing circuitry 106, can be configured to aggregate the data point with another data point of a map layer associated with the first spatial reference point in response to a determination that a distance between the data point and the other data point satisfies a defined criterion.

In one or more embodiments, the apparatus 102, such as the processing circuitry 106, can be configured to generate one or more road links (e.g., one or more map-matched road links) for the first spatial reference point to facilitate an autonomous level prediction for vehicles associated with the first spatial reference point. For instance, in one or more embodiments, the apparatus 102, such as the processing circuitry 106, can be configured to map the transition data onto a road network map associated with the first spatial reference point. In certain embodiments, the transition data can correspond to a number between 0-1. For instance, in certain embodiments, the calculated value (e.g., the number between 0-1) can correspond to a percentage chance of likelihood to demonstrate autonomous level prediction. In an aspect, the apparatus 102, such as the processing circuitry 106, can be configured to map the transition data based on level of defined autonomy. In an example, a first map layer associated with the first spatial reference point can indicate a calculated value for predicted Level 2 capabilities, a second map layer associated with the first spatial reference point can indicate a calculated value for predicted Level 3 capabilities, a third map layer associated with the first spatial reference point can indicate a calculated value for predicted Level 4 capabilities, a fourth map layer associated with the first spatial reference point can indicate a calculated value for predicted Level 5 capabilities, and/or another map layer associated with the first spatial reference point can indicate a calculated value for capabilities of a sub-level associated with a degree of autonomous driving for vehicles associated with the first spatial reference point.

In one or more embodiments, the apparatus 102, such as the processing circuitry 106, can be configured to generate and/or update transition pattern data (e.g., disengagement pattern data and/or engagement pattern data) for a map layer associated with the first spatial reference point based on the transition data. For example, in one or more embodiments, the apparatus 102, such as the processing circuitry 106, can be configured to generate and/or update transition patterns (e.g., disengagement patterns and/or engagement patterns) associated with historical data for the first spatial reference point. In one or more embodiments, the apparatus 102, such as the processing circuitry 106, can be configured to combine real-time transition data for the first spatial reference point with historical transition patterns (e.g., historical disengagement patterns and/or historical engagement patterns) for the first spatial reference point.

In one or more embodiments, the transition data associated with the first spatial reference point that is encoded in the database can be employed by one or more vehicles associated with the first spatial reference point to facilitate autonomous driving for the one or more vehicles when traveling proximate the first spatial reference point. In one or more embodiments, one or more notifications can be provided to a display of one or more vehicles associated with the first spatial reference point based on the aggregated autonomous level data encoded in the database. For example, in response to a determination that a particular road segment associated with the first spatial reference point has a high level of reduction of autonomous driving level, then a notification can be generated to advise that other vehicles will be reducing a level of autonomy. In one or more embodiments, a vehicle associated with the first spatial reference point can employ the transition data associated with the first spatial reference point that is encoded in the database to determine a risk level for autonomous driving by the vehicle while traveling proximate the first spatial reference point.

In another embodiment, the apparatus 102, such as the processing circuitry 106, can be configured to encode the transition data (e.g., new transition data, new disengagement data, new engagement data, new autonomous level data, new location data, new time data, new vehicle version data, new vehicle data, new vehicle context data, and/or other transition data) for the second spatial reference point (e.g., the spatial reference point 502) in a database to facilitate autonomous driving proximate the second spatial reference point. In one or more embodiments, the transition data for the second spatial reference point can be encoded into the map database 104, the map database 410, and/or another database accessible by the apparatus 102.

In certain embodiments, the apparatus 102, such as the processing circuitry 106, can be configured to map the transition data for the second spatial reference point onto one or more map data layers of a map (e.g., an HD map) to facilitate the autonomous level prediction for vehicles associated with the second spatial reference point. For instance, in certain embodiments, the apparatus 102, such as the processing circuitry 106, can be configured to store the aggregated autonomous level data in a map data layer of a map (e.g., an HD map) for mapping purposes, navigation purposes, and/or autonomous driving purposes associated with the second spatial reference point. In certain embodiments, the apparatus 102, such as the processing circuitry 106, can be configured to store the transition data for the second spatial reference point in two or more map data layer of a map (e.g., an HD map) for mapping purposes, navigation purposes, and/or autonomous driving purposes associated with the second spatial reference point. For example, in an embodiment, transition data for a first type of vehicle model can be stored in a first map data layer associated with the second spatial reference point, transition data for a second type of vehicle model can be stored in a second map data layer associated with the second spatial reference point, etc. Additionally or alternatively, in an embodiment, transition data for a first location associated with the second spatial reference point can be stored in a first map data layer, transition data for a second location associated with the second spatial reference point can be stored in a second map data layer, etc. Additionally or alternatively, in an embodiment, transition data for a first time or date can be stored in a first map data layer associated with the second spatial reference point, transition data for a second time or date can be stored in a second map data layer associated with the second spatial reference point, etc. Additionally or alternatively, in an embodiment, transition data for a first type of vehicle version can be stored in a first map data layer associated with the second spatial reference point, transition data for a second type of vehicle version can be stored in a second map data layer associated with the second spatial reference point, etc. Additionally or alternatively, in an embodiment, transition data for a first type of reason can be stored in a first map data layer associated with the second spatial reference point, transition data for a second type of reason can be stored in a second map data layer associated with the second spatial reference point, etc. Additionally or alternatively, in an embodiment, transition data for vehicles traveling in a first direction with respect to a road segment associated with the second spatial reference point can be stored in a first map data layer, transition data for vehicles traveling in a first direction with respect to a road segment associated with the second spatial reference point can be stored in a second map data layer, etc. In certain embodiments, the apparatus 102, such as the processing circuitry 106, can be configured to link and/or associate the transition data with one or more portions, components, areas, layers, features, text, symbols, and/or data records of a map (e.g., an HD map) associated with the second spatial reference point.

In one or more embodiments, the apparatus 102, such as the processing circuitry 106, can be configured to generate a data point for a map layer associated with the second spatial reference point based on the transition data. The data point can indicate the transition of an autonomous level for vehicles associated with the second spatial reference point and/or a location associated with the transition of the autonomous levels for the vehicles associated with the second spatial reference point. Additionally or alternatively, in one or more embodiments, the apparatus 102, such as the processing circuitry 106, can be configured to store the data point in the database associated with a map layer associated with the second spatial reference point. The map layer associated with the second spatial reference point can include the data point and one or more other data points that indicate one or more other locations related to respective autonomous level transitions for one or more other vehicles associated with the second spatial reference point. In certain embodiments, the apparatus 102, such as the processing circuitry 106, can be configured to aggregate the data point with another data point of a map layer associated with the second spatial reference point in response to a determination that a distance between the data point and the other data point satisfies a defined criterion.

In one or more embodiments, the apparatus 102, such as the processing circuitry 106, can be configured to generate one or more road links (e.g., one or more map-matched road links) for the second spatial reference point to facilitate an autonomous level prediction for vehicles associated with the second spatial reference point. For instance, in one or more embodiments, the apparatus 102, such as the processing circuitry 106, can be configured to map the transition data onto a road network map associated with the second spatial reference point. In certain embodiments, the transition data can correspond to a number between 0-1. For instance, in certain embodiments, the calculated value (e.g., the number between 0-1) can correspond to a percentage chance of likelihood to demonstrate autonomous level prediction. In an aspect, the apparatus 102, such as the processing circuitry 106, can be configured to map the transition data based on level of defined autonomy. In an example, a first map layer associated with the second spatial reference point can indicate a calculated value for predicted Level 2 capabilities, a second map layer associated with the second spatial reference point can indicate a calculated value for predicted Level 3 capabilities, a third map layer associated with the second spatial reference point can indicate a calculated value for predicted Level 4 capabilities, a fourth map layer associated with the second spatial reference point can indicate a calculated value for predicted Level 5 capabilities, and/or another map layer associated with the second spatial reference point can indicate a calculated value for capabilities of a sub-level associated with a degree of autonomous driving for vehicles associated with the second spatial reference point.

In one or more embodiments, the apparatus 102, such as the processing circuitry 106, can be configured to generate and/or update transition pattern data (e.g., disengagement pattern data and/or engagement pattern data) for a map layer associated with the second spatial reference point based on the transition data. For example, in one or more embodiments, the apparatus 102, such as the processing circuitry 106, can be configured to generate and/or update transition patterns (e.g., disengagement patterns and/or engagement patterns) associated with historical data for the second spatial reference point. In one or more embodiments, the apparatus 102, such as the processing circuitry 106, can be configured to combine real-time transition data for the second spatial reference point with historical transition patterns (e.g., historical disengagement patterns and/or historical engagement patterns) for the second spatial reference point.

In one or more embodiments, the transition data associated with the second spatial reference point that is encoded in the database can be employed by one or more vehicles associated with the second spatial reference point to facilitate autonomous driving for the one or more vehicles when traveling proximate the second spatial reference point. In one or more embodiments, one or more notifications can be provided to a display of one or more vehicles associated with the second spatial reference point based on the aggregated autonomous level data encoded in the database. For example, in response to a determination that a particular road segment associated with the second spatial reference point has a high level of reduction of autonomous driving level, then a notification can be generated to advise that other vehicles will be reducing a level of autonomy. In one or more embodiments, a vehicle associated with the second spatial reference point can employ the transition data associated with the second spatial reference point that is encoded in the database to determine a risk level for autonomous driving by the vehicle while traveling proximate the second spatial reference point.

FIG. 7 illustrates an example embodiment of an architecture specifically configured for implementing embodiments described herein. The illustrated embodiment of FIG. 7 may be vehicle-based, where transition data 702 is calculated for one or more vehicles (e.g., the vehicle 400) traveling along a road segment (e.g., the road segment 402). Additionally or alternatively, in one or more embodiments autonomous level data, location data and/or other data can be obtained from vehicles to facilitate calculation of the transition data 702. In one or more embodiments, the location data can be obtained from the one or more vehicles using GPS or other localization techniques. According to one or more embodiments, the transition data 702 can be correlated to map data of the map data service provider 608. A vehicle with autonomous or semi-autonomous control may establish accurate location and/or improved autonomous driving functionality through the transition data 702 to facilitate the autonomous or semi-autonomous control.

As illustrated in FIG. 7, the architecture includes the map data service provider 608 that provides map data 725 (e.g., HD maps and policies associated with road links within the map) to an Advanced Driver Assistance System (ADAS) 705, which may be vehicle-based or server based depending upon the application. The map data service provider 608 may be a cloud-based 710 service. In one or more embodiments, the ADAS 705 receives the transition data 702 and may provide the transition data 702 to map matcher 715. The map matcher 715 may correlate the transition data 702 to a road link on a map of the mapped network of roads stored in the map cache 720. This link or segment, along with the direction of travel, may be used to establish which HD map policies are applicable to the vehicle associated with the ADAS 705, including sensor capability information, autonomous functionality information, etc. Accordingly, in one or more embodiments, policies for the vehicle are established based on the transition data 702. The map data 725 associated with the road segment specific to the vehicle are provided to the vehicle control, such as via the CAN (computer area network) BUS (or Ethernet or Flexray) 740 to the electronic control unit (ECU) 745 of the vehicle to implement HD map policies, such as various forms of autonomous or assisted driving, or navigation assistance. In certain embodiments, a data access layer 735 can manage and/or facilitate access to the map cache 720, the map data 725, and/or an ADAS map database 730. In an embodiment, at least a portion of the map database 730 can correspond to the map database 104 and/or the map database 610.

By employing a transition variability index in accordance with one or more example embodiments of the present disclosure, precision and/or confidence of vehicle localization and/or autonomous driving for a vehicle (e.g., the vehicle 400) can be improved. Furthermore, by employing a transition variability index in accordance with one or more example embodiments of the present disclosure, improved navigation of a vehicle can be provided, improved route guidance for a vehicle can be provided, improved semi-autonomous vehicle control can be provided, improved fully autonomous vehicle control can be provided, and/or improved safety of a vehicle can be provided. Moreover, in accordance with one or more example embodiments of the present disclosure, efficiency of an apparatus including the processing circuitry can be improved and/or the number of computing resources employed by processing circuitry can be reduced. In one or more embodiments, by employing a transition variability index in accordance with one or more example embodiments of the present disclosure, improved statistical information for a road segment can be provided to provide improved recommendations for infrastructure improvements.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Furthermore, in some embodiments, additional optional operations can be included. Modifications, additions, or amplifications to the operations above can be performed in any order and in any combination.

Moreover, although the foregoing descriptions and the associated drawings describe example embodiments in the context of certain example combinations of elements and/or functions, it should be appreciated that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

That which is claimed:

1. A computer-implemented method for generating a transition variability index related to autonomous driving, the computer-implemented method comprising:
    calculating a first transition variability index indicative of a first degree of variability in relation to transition of vehicles from respective autonomous levels while traveling proximate a first spatial reference point during different intervals of time;
    calculating a second transition variability index indicative of a second degree of variability in relation to transition of vehicles from respective autonomous levels while traveling along proximate a second spatial reference point during the different intervals of time;
    prioritizing updating of transition data associated with one of the first and second spatial reference points relative to the other one of the first and second spatial reference points based on a comparison between the first transition variability index for the first spatial reference point and the second transition variability index for the second spatial reference point, wherein the prioritizing comprises updating the transition data for the first spatial reference point prior to the transition data for the second spatial reference point in response to a determination that the first transition variability index for the first spatial reference point is indicative of greater variability than the second transition variability index for the second spatial reference point; and
    encoding the transition data that has been updated for the one of the first and second spatial reference points in a database to facilitate autonomous driving proximate the one of the first and second spatial reference points.

2. The computer-implemented method of claim 1, wherein the calculating the first transition variability index comprises calculating a transition variability index that is indicative of a transition from a particular autonomous level due to a decrease in a strength of a communication signal associated with a vehicle while traveling proximate the first spatial reference point.

3. The computer-implemented method of claim 1, wherein the calculating the first transition variability index comprises calculating a transition variability index that is indicative of a transition from a particular autonomous level due to satisfaction of a particular road condition while traveling proximate the first spatial reference point.

4. The computer-implemented method of claim 1, wherein the calculating the first transition variability index comprises calculating a transition variability index for a vehicle that is disengaged from a particular autonomous level due to the first spatial reference point satisfying a particular traffic condition while traveling along the first spatial reference point.

5. The computer-implemented method of claim 1, wherein the calculating the first transition variability index comprises calculating a transition variability index for a first vehicle that is disengaged from a particular autonomous level due to the first spatial reference point satisfying a pedestrian traffic condition while traveling along the first spatial reference point.

6. The computer-implemented method of claim 1, further comprising:
    facilitating routing of a vehicle associated with the first spatial reference point based on the transition data.

7. The computer-implemented method of claim 1, further comprising:
    causing rendering of data via a map display based on the transition data.

8. The computer-implemented method of claim 1, wherein the calculating the second transition variability index comprises calculating a transition variability index that is indicative of a transition from a particular autonomous level due to a decrease in a strength of a communication signal associated with a vehicle while traveling proximate the second spatial reference point.

9. The computer-implemented method of claim 1, wherein the calculating the second transition variability index comprises calculating a transition variability index that is indicative of a transition from a particular autonomous level due to satisfaction of a particular road condition while traveling proximate the second spatial reference point.

10. An apparatus configured to generate a transition variability index related to autonomous driving, the apparatus comprising processing circuitry and at least one memory including computer program code instructions, the computer program code instructions configured to, when executed by the processing circuitry, cause the apparatus to:
    calculate a transition variability index that comprises first variability data associated with a first degree of variability in relation to transition of vehicles from respective autonomous levels while traveling proximate a first spatial reference point during different intervals of time, and second variability data associated with a second degree of variability in relation to transition of vehicles from respective autonomous levels while traveling along proximate a second spatial reference point during the different intervals of time;
    prioritize updating of transition data associated with one of the first and second spatial reference points relative to the other one of the first and second spatial reference points based on a comparison between the first variability data for the first spatial reference point and the second variability data for the second spatial reference point, wherein the transition data for the first spatial reference point is updated prior to the transition data for the second spatial reference point in response to a determination that the first variability data for the first spatial reference point is indicative of greater variability than the second variability data for the second spatial reference point; and encode the transition data that has been updated for the one of the first and second spatial reference points in a database to facilitate autonomous driving proximate the one of the first and second spatial reference points.

11. The apparatus of claim 10, wherein the computer program code instructions are further configured to, when executed by the processing circuitry, cause the apparatus to calculate a transition variability index that is indicative of a transition from a particular autonomous level due to a decrease in a strength of a communication signal associated with a vehicle while traveling proximate the first spatial reference point.

12. The apparatus of claim 10, wherein the computer program code instructions are further configured to, when executed by the processing circuitry, cause the apparatus to calculate a transition variability index that is indicative of a transition from a particular autonomous level due to satisfaction of a particular road condition while traveling proximate the first spatial reference point.

13. The apparatus of claim 10, wherein the computer program code instructions are further configured to, when executed by the processing circuitry, cause the apparatus to calculate a transition variability index for a vehicle that is disengaged from a particular autonomous level due to the first spatial reference point satisfying a particular traffic condition while traveling along the first spatial reference point.

14. The apparatus of claim 10, wherein the computer program code instructions are further configured to, when executed by the processing circuitry, cause the apparatus to calculate a transition variability index for a first vehicle that is disengaged from a particular autonomous level due to the first spatial reference point satisfying a pedestrian traffic condition while traveling along the first spatial reference point.

15. The apparatus of claim 10, wherein the computer program code instructions are further configured to, when executed by the processing circuitry, cause the apparatus to facilitate routing of a vehicle associated with the first spatial reference point based on the transition data.

16. The apparatus of claim 10, wherein the computer program code instructions are further configured to, when executed by the processing circuitry, cause the apparatus to cause rendering of data via a map display based on the transition data.

17. A computer program product comprising at least one non-transitory computer-readable storage medium having computer-executable program code instructions stored therein, the computer-executable program code instructions comprising program code instructions to:

calculate a first transition variability index indicative of a first degree of variability in relation to transition of vehicles from respective autonomous levels while traveling proximate a first spatial reference point during different intervals of time;

calculate a second transition variability index indicative of a second degree of variability in relation to transition of vehicles from respective autonomous levels while traveling along proximate a second spatial reference point during the different intervals of time; and facilitate navigation of a vehicle proximate one of the first and second spatial reference points based on a comparison between the first transition variability index for the first spatial reference point and the second transition variability index for the second spatial reference point wherein transition data for the first spatial reference point is updated prior to transition data for the second spatial reference point in response to a determination that the first variability data for the first spatial reference point is indicative of greater variability than the second variability data for the second spatial reference point.

18. The computer program product of claim 17, further comprising program code instructions to facilitate autonomous driving of the vehicle proximate the one of the first and second spatial reference points based on the comparison between the first transition variability index for the first spatial reference point and the second transition variability index for the second spatial reference point.

19. The computer program product of claim 17, further comprising program code instructions to facilitate routing of the vehicle proximate the one of the first and second spatial reference points based on the comparison between the first transition variability index for the first spatial reference point and the second transition variability index for the second spatial reference point.

20. The computer program product of claim 17, further comprising program code instructions to cause rendering of data via a map display of the vehicle based on the comparison between the first transition variability index for the first spatial reference point and the second transition variability index for the second spatial reference point.

\* \* \* \* \*